(12) United States Patent
Sandall et al.

(10) Patent No.: US 12,437,057 B1
(45) Date of Patent: *Oct. 7, 2025

(54) PORTABLE POLICY EXECUTION USING EMBEDDED MACHINES

(71) Applicant: Apple Inc., Cupertino, CA (US)

(72) Inventors: Torin Sandall, San Francisco, CA (US); Timothy L Hinrichs, Los Altos, CA (US); Teemu Koponen, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,186

(22) Filed: Feb. 24, 2023

Related U.S. Application Data

(63) Continuation of application No. 16/773,923, filed on Jan. 27, 2020, now Pat. No. 11,593,525.

(60) Provisional application No. 62/892,735, filed on Aug. 28, 2019, provisional application No. 62/855,726, filed on May 31, 2019, provisional application No. 62/846,461, filed on May 10, 2019.

(51) Int. Cl.
| | | |
|---|---|---|
| *G06F 21/54* | (2013.01) |
| *G06F 9/455* | (2018.01) |
| *G06F 9/54* | (2006.01) |
| *G06F 21/62* | (2013.01) |
| *H04L 9/40* | (2022.01) |

(52) U.S. Cl.
CPC .......... *G06F 21/54* (2013.01); *G06F 9/45558* (2013.01); *G06F 9/547* (2013.01); *G06F 21/629* (2013.01); *H04L 63/102* (2013.01); *H04L 63/20* (2013.01); *G06F 2009/45595* (2013.01); *G06F 2221/033* (2013.01)

(58) Field of Classification Search
CPC .... G06F 21/629; G06F 9/45558; G06F 9/547; H04L 63/102; H04L 63/20
See application file for complete search history.

(56) References Cited

U.S. PATENT DOCUMENTS

| | | |
|---|---|---|
| 5,974,549 A | 10/1999 | Golan |
| 6,985,953 B1 | 1/2006 | Sandhu et al. |
| 7,096,367 B2 | 8/2006 | Garg et al. |
| 7,124,192 B2 | 10/2006 | High, Jr. et al. |
| 7,752,661 B2 | 7/2010 | Hemsath et al. |
| 7,913,300 B1 | 3/2011 | Flank et al. |
| 8,266,694 B1 | 9/2012 | Roy |
| 8,613,070 B1 | 12/2013 | Borzycki et al. |

(Continued)

OTHER PUBLICATIONS

Barrio (Study of the techniques for emulation programming, 152 pages, Jun. 18, 2001) (Year: 2001).*

(Continued)

*Primary Examiner* — Oleg Korsak
(74) *Attorney, Agent, or Firm* — BAKERHOSTETLER

(57) ABSTRACT

Some embodiments provide a method for evaluating authorization policies that restrict access to API (Application Programming Interfaces) calls to an application executing on a host system. At the application, the method receives an API call to execute. The method directs a process virtual machine (VM) executing inside the application to make an authorization decision for the API call. The method executes the API call after receiving an authorization decision to allow the API call from the process VM executing inside the application.

20 Claims, 15 Drawing Sheets

(56) References Cited

U.S. PATENT DOCUMENTS

| | | | |
|---|---|---|---|
| 8,683,560 | B1 | 3/2014 | Brooker et al. |
| 8,782,744 | B1 | 7/2014 | Fuller et al. |
| 8,789,138 | B2 | 7/2014 | Reierson et al. |
| 9,397,990 | B1 | 7/2016 | Taly et al. |
| 9,530,020 | B2 | 12/2016 | Brandwine et al. |
| 9,578,004 | B2 | 2/2017 | Greenspan et al. |
| 9,648,040 | B1 | 5/2017 | Morkel et al. |
| 10,122,757 | B1 | 11/2018 | Kruse et al. |
| 10,127,393 | B2 | 11/2018 | Ferraiolo et al. |
| 10,182,129 | B1 | 1/2019 | Peterson et al. |
| 10,257,184 | B1 | 4/2019 | Mehta et al. |
| 10,353,726 | B2 | 7/2019 | Duan |
| 10,454,975 | B1 | 10/2019 | Mehr |
| 10,469,314 | B2 | 11/2019 | Ennis, Jr. et al. |
| 10,574,699 | B1 | 2/2020 | Baer et al. |
| 10,592,302 | B1 | 3/2020 | Hinrichs et al. |
| 10,592,683 | B1 | 3/2020 | Lim et al. |
| 10,715,514 | B1 | 7/2020 | Threlkeld |
| 10,719,373 | B1 | 7/2020 | Koponen et al. |
| 10,740,470 | B2 | 8/2020 | Ionescu et al. |
| 10,789,220 | B2 | 9/2020 | Mayer et al. |
| 10,984,133 | B1 | 4/2021 | Hinrichs et al. |
| 10,986,131 | B1 | 4/2021 | Kruse et al. |
| 10,990,702 | B1 | 4/2021 | Hinrichs et al. |
| 11,023,292 | B1 | 6/2021 | Hinrichs et al. |
| 11,080,410 | B1 | 8/2021 | Sandall et al. |
| 11,108,827 | B2 | 8/2021 | Beckman et al. |
| 11,108,828 | B1 | 8/2021 | Curtis et al. |
| 11,170,099 | B1 | 11/2021 | Sandall et al. |
| 11,228,573 | B1 | 1/2022 | Rangasamy et al. |
| 11,245,728 | B1 | 2/2022 | Curtis et al. |
| 11,258,824 | B1 | 2/2022 | Hinrichs et al. |
| 11,327,815 | B1 | 5/2022 | Koponen et al. |
| 11,425,126 | B1 | 8/2022 | Horal et al. |
| 11,496,517 | B1 | 11/2022 | Hinrichs et al. |
| 11,509,658 | B1 | 11/2022 | Kulkarni |
| 11,516,253 | B1 | 11/2022 | Van Deman et al. |
| 11,593,525 | B1 * | 2/2023 | Sandall ............... G06F 21/629 |
| 11,604,684 | B1 | 3/2023 | Hinrichs et al. |
| 11,847,241 | B1 | 12/2023 | Cahill et al. |
| 2004/0083367 | A1 | 4/2004 | Garg et al. |
| 2005/0114674 | A1 | 5/2005 | Carley |
| 2007/0156670 | A1 | 7/2007 | Lim |
| 2008/0184336 | A1 | 7/2008 | Sarukkai et al. |
| 2009/0063665 | A1 | 3/2009 | Bagepalli et al. |
| 2009/0077618 | A1 | 3/2009 | Pearce et al. |
| 2009/0281996 | A1 | 11/2009 | Liu et al. |
| 2010/0333079 | A1 * | 12/2010 | Sverdlov ............... G06F 21/54 717/168 |
| 2011/0113484 | A1 | 5/2011 | Zeuthen |
| 2012/0030354 | A1 | 2/2012 | Razzaq et al. |
| 2012/0066756 | A1 | 3/2012 | Vysogorets et al. |
| 2012/0311672 | A1 | 12/2012 | Connor et al. |
| 2012/0331539 | A1 | 12/2012 | Matsugashita |
| 2013/0226970 | A1 | 8/2013 | Weber et al. |
| 2014/0032691 | A1 | 1/2014 | Barton et al. |
| 2014/0032759 | A1 | 1/2014 | Barton et al. |
| 2014/0033267 | A1 | 1/2014 | Aciicmez |
| 2014/0237594 | A1 | 8/2014 | Thakadu et al. |
| 2015/0089575 | A1 | 3/2015 | Vepa et al. |
| 2015/0213449 | A1 | 7/2015 | Morrison et al. |
| 2015/0244724 | A1 | 8/2015 | Xu et al. |
| 2016/0034900 | A1 | 2/2016 | Nelsen et al. |
| 2016/0057107 | A1 | 2/2016 | Call et al. |
| 2016/0188898 | A1 | 6/2016 | Karinta et al. |
| 2017/0024428 | A1 | 1/2017 | Patiejunas et al. |
| 2017/0111336 | A1 | 4/2017 | Davis et al. |
| 2017/0161120 | A1 | 6/2017 | Sasaki et al. |
| 2017/0220370 | A1 | 8/2017 | Klompje et al. |
| 2017/0237729 | A1 | 8/2017 | Uppalapati |
| 2017/0302655 | A1 | 10/2017 | Sondhi et al. |
| 2017/0346807 | A1 | 11/2017 | Blasi |
| 2017/0364702 | A1 | 12/2017 | Goldfarb et al. |
| 2018/0067790 | A1 | 3/2018 | Chheda et al. |
| 2018/0082053 | A1 | 3/2018 | Brown et al. |
| 2018/0109538 | A1 | 4/2018 | Kumar et al. |
| 2018/0309746 | A1 | 10/2018 | Blasi |
| 2019/0007418 | A1 | 1/2019 | Cook et al. |
| 2019/0007443 | A1 | 1/2019 | Cook et al. |
| 2019/0080103 | A1 | 3/2019 | Hadzic et al. |
| 2019/0190959 | A1 | 6/2019 | Yuan |
| 2019/0230130 | A1 | 7/2019 | Beckman et al. |
| 2019/0245862 | A1 | 8/2019 | Kruse et al. |
| 2019/0273746 | A1 | 9/2019 | Coffing |
| 2019/0386973 | A1 | 12/2019 | Patwardhan et al. |
| 2020/0007580 | A1 | 1/2020 | Liderman et al. |
| 2021/0029029 | A1 | 1/2021 | Mehmedagic et al. |
| 2021/0240550 | A1 | 8/2021 | Hinrichs et al. |
| 2021/0248017 | A1 | 8/2021 | Hinrichs et al. |
| 2021/0365571 | A1 | 11/2021 | Sandall et al. |
| 2022/0269549 | A1 | 8/2022 | Koponen et al. |

OTHER PUBLICATIONS

Author Unknown, "API Best Practices Managing the API Lifecycle: Design, Delivery, and Everything in Between," Dec. 2016, 37 pages, Apigee, retrieved from https://pages.apigee.com/rs/351-WXY-166/images/API-Best-Practices-ebook-2016-12.pdf.

Costa, Jeff, "Improve API Performance with Caching," API Gateway, May 31, 2018, 18 pages, Akamai Developer, retrieved from https://developer.akamai.com/blog/2018/05/31/improve-api-performance-caching.

Moffett, Jonathan D., et al., "Policy Hierarchies for Distributed Systems Management," IEEE Journal on Selected Areas in Communications, Dec. 1993, 11 pages, vol. 11, IEEE, USA.

Non-Published commonly Owned U.S. Appl. No. 16/050,119, filed Jul. 31, 2018, 55 pages, Styra, Inc.

Non-Published commonly Owned U.S. Appl. No. 18/120,810, filed Mar. 13, 2023, 63 pages, Styra, Inc.

Win, Thu Yein, et al., "Virtualization Security Combining Mandatory Access Control and Virtual Machine Introspection," 2014 IEEE/ACM 7th International Conference on Utility and Cloud Computing, Dec. 8-11, 2014, 6 pages, IEEE, London, UK.

* cited by examiner

```
package VM_modification.authz import data.ldap                    902
import data.incident
import data.jira.issues

# Example input
# input = { "user": "alice" }
                                    905
# Allow if user in engineering and not blocked
allow {
    ldap.group["engineering"] [_] = input.user
    not blocked
}
                                    910
# Blocked during incident
blocked {
    incident = "True"
    not temporary_exemption
}

# Grant exception using Jira    915
temporary_exemption {
    issues[i].fields.assignee = input.user
    issues[i].labels[_] = incident.True_label
}
```

*Figure 9*

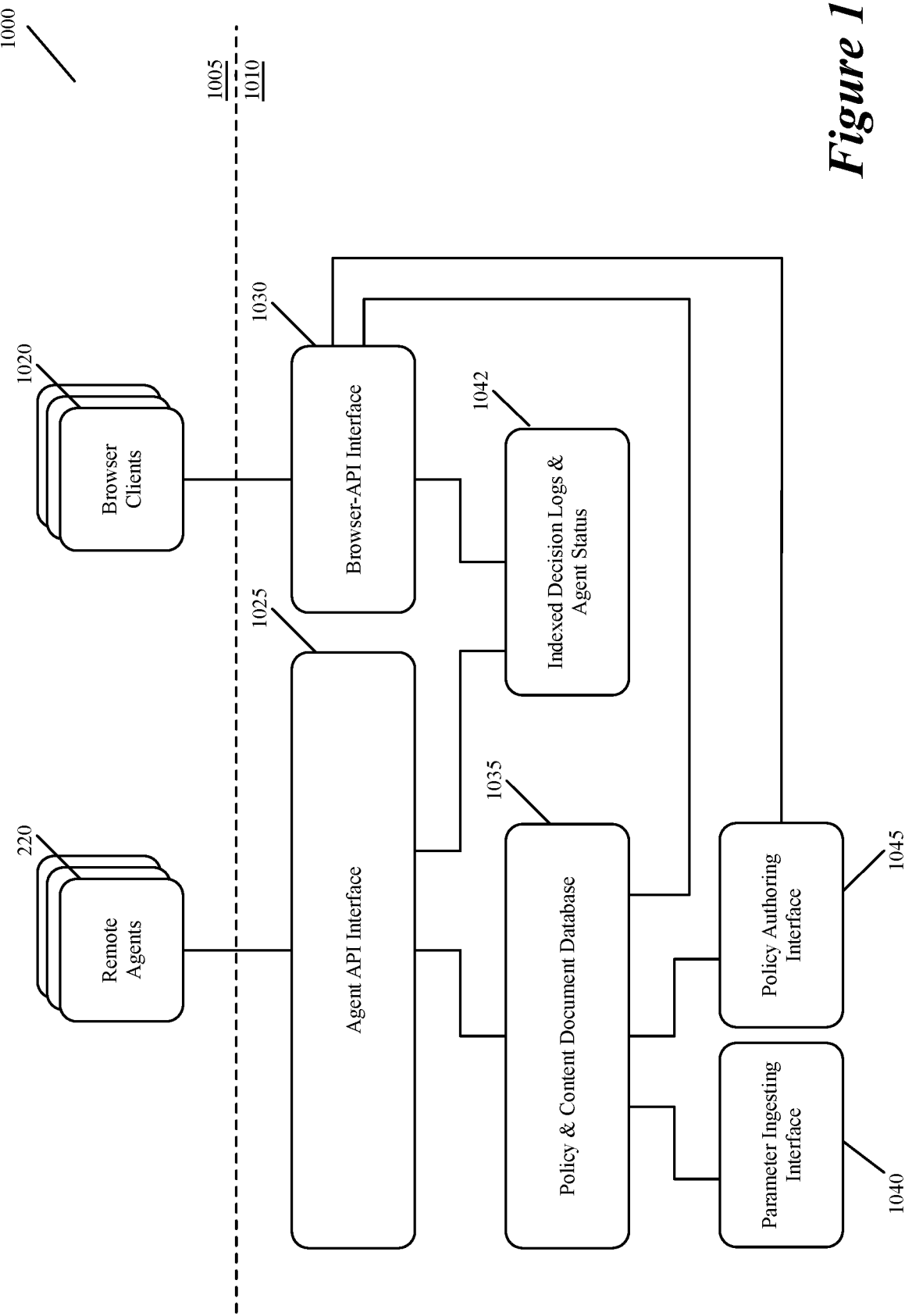

PORTABLE POLICY EXECUTION USING EMBEDDED MACHINES

CLAIM OF BENEFIT TO PRIOR APPLICATIONS

This application is a continuation application of U.S. patent application Ser. No. 16/773,923, filed Jan. 27, 2020. U.S. patent application Ser. No. 16/773,923 claims the benefit of U.S. Provisional Patent Application 62/892,735, filed Aug. 28, 2019, U.S. Provisional Patent Application 62/855,726, filed May 31, 2019, and U.S. Provisional Patent Application 62/846,461, filed May 10, 2019. U.S. patent application Ser. No. 16/773,923 is incorporated herein by reference.

BACKGROUND

Software systems execute policies for multitude of reasons: to decide whether an incoming API request should be allowed or not (authorization policies), to decide how to transform data before passing it to another system or back to user (data filtering policies), or more generally, to decide what is an appropriate action to take given an event indicating change of state or an API request. These policies often reflect higher level business conditions that vary over time, separately from the code and which are often specific to the operational environment the system runs within. Therefore, it is preferable to model the policy as code that is decoupled from the actual system implementation code.

Software systems may be microservices, implementing end-user-visible applications or providing pure API services for other microservices. Software systems may also be infrastructure level components that facilitate the execution of application level workloads. In the following, we refer to such a software system simply as a system, without specifying its kind.

Practical management of policies that are required and used by systems calls for centralization. Instead of managing each copy of a policy separately for each system, managing a single master policy not only reduces the management overhead but also removes the risk of policy drift, i.e., having varying versions of a policy deployed throughout the organization.

Centralized policy execution provides centralized policy management. In centralized execution, systems consult a remote, central policy engine to execute the policies. However, this model comes with high performance penalty, as well as with reduced availability of system, as in practical settings the network between the policy engine and the system is fundamentally unreliable and has only finite capacity to provide.

Therefore, performance and availability motivate the call for distributed execution of policies, even though their centralized management is the preferred management approach. To minimize the impact of policy execution on system performance and availability, one can execute the policies within the systems: this way the systems share the fate with policy execution and there's no cost of network communication, as the policies execute within the same process as the system itself.

Other variations of distributed execution exist. In particular, instead of a single centralized policy execution engine, one can have many engines, so that there is potentially an engine closer to the system for contact. While this reduces the management overhead compared to execution within the system, the fundamental cost of reaching out to a remote policy engine over a network remain, both in terms of performance and availability.

Executing policies within the system comes with practical complications, however. Multiple language runtimes makes it challenging to have a single library implementation to embed into systems. In the worst case, one has to implement and maintain one policy language implementation per programming language. Providing guaranteed execution limits in those implementations complicates them even further. Yet, having well-defined bounds for CPU execution time and memory usage is required for embedding the library into mission critical systems.

Executing a policy engine in a system side-car is a practical compromise that provides most of the benefits of embedding policy execution into the systems without the above complications. In this model, each system instance has its dedicated policy engine next to it, running on the same host—thus fate-sharing with the system, with minimal local-host network communications cost. However, the performance is still non-ideal with the side-cars, since each interaction with the policy engine involves RPC communication which involves marshaling and un-marshaling the policy evaluation calls. Similarly, crossing the process boundaries comes with increased latency cost, compared to a process-internal function call. Moreover, operational requirements may complicate deployment of side-cars: it is not uncommon to have strict limitations on additional processes deployed with the primary system processes. Reducing the programming language and system execution environment specific code is required to tackle the implementation and maintenance cost of embedding policy execution into systems.

BRIEF SUMMARY

Some embodiments of the invention provide an abstract policy execution virtual machine that has its own instruction set. While the implementation of the virtual machine is still specific to the programming language and environment, the instruction set is limited enough in some embodiments to keep the virtual machine implementation considerably simpler than the entire policy evaluation engine.

In some embodiments, the instruction set is sufficiently expressive for implementing the policy execution, but not the parsing, compilation, or optimization of the policies. These functions can remain outside of the virtual machine in such embodiments, to be executed by the system as a part of its bootstrapping procedures.

In some embodiments, the policy evaluation may be split into two or more parts. For example, in some embodiments there is a compiler-implemented pre-evaluation that evaluates the majority of the policy, leaving the absolute minimum policy for evaluation by the virtual machine.

In some embodiments, execution costs are dominated by the secondary costs involving setting up the virtual machine with policies and any data necessary for their execution. Therefore, in such embodiments, the optimality of the short lived policy executions themselves is less critical. Hence, the instruction execution often does not need to be perfectly optimized.

In some embodiments, the instruction set can be custom tailored for policy execution. It is also easier in such embodiments to keep the instruction set stable, even as the policy language evolves. This translates to more stable programming language- and environment-specific code.

Providing strong memory and CPU limits is challenging with general purpose programming languages. CPU limits may require custom scheduling implementation and memory limits require implementing custom memory management. Therefore, implementing them for each programming language and execution environment is a major cost. Executing the policies within a virtual machine in some embodiments makes providing these limits straightforward: it is easy in such embodiments for the virtual machine to limit the number of virtual instructions executed per policy as well as to limit the maximum memory allocated per policy. Memory isolation can be implemented equally easily in such embodiments with virtual machines, reducing the amount of security critical code from the full evaluation engine to the virtual machine implementation.

Compiling the policies into an abstract instruction set does not translate the extensions a policy language may have. It is common to have a range of built-ins, that in some embodiments can be compiled into the policy language evaluation runtime. These built-ins act as plugins that can be implemented using traditional programming languages in some embodiments, extending the expressivity and capabilities of the policy language without changing the language specification itself. In some embodiments, these plugins still have to be provided as extensions and compiled into the virtual machine, and they have to be implemented in some embodiments in multiple languages, for multiple execution environments, just like the virtual machine itself.

While the virtual machine instruction set may in some embodiments be entirely custom and thus requiring a custom virtual machine, it is also possible in some embodiments to leverage existing, more general purpose virtual machine implementations, as long as they provide sufficient expressivity and provide the ability to integrate with the desired programming languages and their execution environments. In particular, virtual machine instruction sets such as WebAssembly (WASM) and Lua meet these requirements. However, less general purpose instruction sets are also an option in some embodiments, but may require limiting the policies that are to be compiled and supported. One an example of such a more limited, less general instruction set is extended Berkeley Packet Filter (eBPF), used in the Linux kernel.

Executing the policy within a virtual machine effectively isolates it from the rest of the system execution environment in some embodiments. Even though the virtual machine runs as a consequence of a function call, within the same process, passing information in and out to/from it requires more effort. This is in addition to the bootstrapping of the virtual machine itself, which in some embodiments may require initialization of data structures and memory areas that incur non-trivial cost.

This information passing shares similarities with the cost of RPC. The parameters for the policy execution as well as the return values returned may in some embodiments have to be marshalled and un-marshalled as they cross the boundary between the virtual machine and the remaining process. This is because the virtual machine instructions and the system execution environment are unlikely in some embodiments to share a common representation for the data types. While still more effective than communicating over the network, the cost remains higher than as a local function where information requires no translation between the caller and callee.

Several mechanisms, or their combinations, can be used in some embodiments to alleviate the cost of the boundary. Each of these mechanisms is described in more detail below.

First, information passed across the boundary can be minimized in some embodiments, for example by writing policies to accept and return minimal information, or by statically analyzing the policies and thus identifying the information they actually need. In practical settings, this may allow in some embodiments removing the majority of the information that is passed in. In particular, if in some embodiments the information passed in is structured (e.g. JSON), policies may only refer to certain fields within the document, while the rest of the fields can be filtered out before transmitting it over the boundary.

Second, virtual machines can be recycled in some embodiments, instead of constructing them from scratch for each policy evaluation.

Third, in some embodiments, information may be represented in binary formats that are understood by both sides, i.e. the system hosting the virtual machine and the virtual machine instructions. This way the data requires no serialization and deserialization as it crosses the boundary. The information passing cost in such embodiments becomes a cost of copying the data over.

Fourth, shared binary formats open the door in some embodiments for shared memory-based zero-copy information passing.

Fifth, information passing may in some embodiments be more fine-grained, or "lazy," in that information is only shared and transmitted across the boundary if it is requested by the evaluation or the system code inspecting the result of the evaluation.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 9 illustrates an example of the policy opcode and operand that can be used to implement API-authorization controls similar to those of the examples illustrated in FIG. 6-8

FIG. 10 illustrates the software architecture of the server set of some embodiments of the invention.

DETAILED DESCRIPTION

Figure 1:
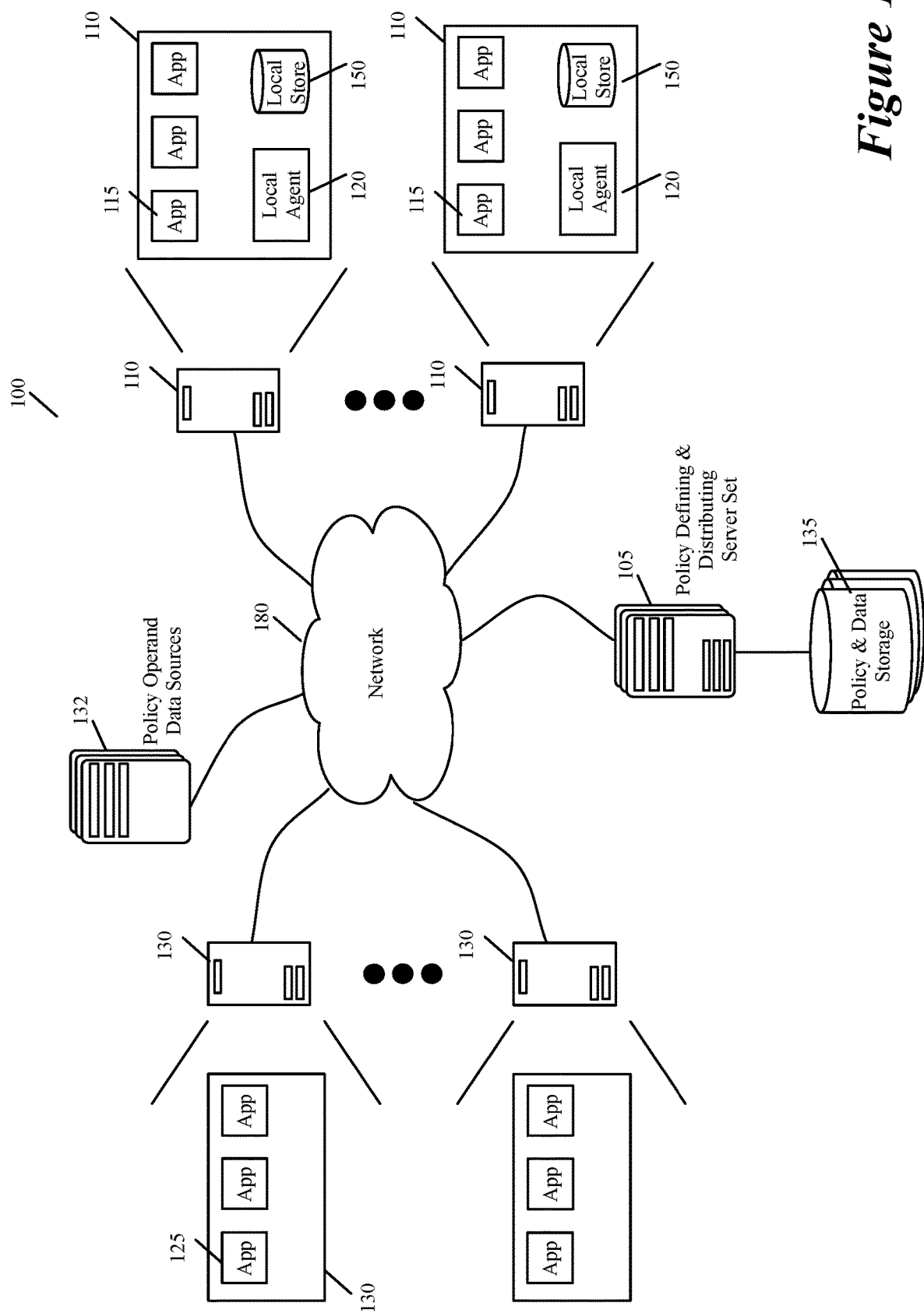
FIG. 1 conceptually illustrates the architecture of an API-authorization system.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a system for defining, distributing and enforcing policies for authorizing API (Application Programming Interface) calls to applications executing on one or more sets of associated machines (e.g., virtual machines, containers, computers, etc.) in one or more datacenters. This system has a set of one or more servers that acts as a logically centralized resource for defining, storing, and distributing policies and parameters for evaluating these policies.

The server set in some embodiments receives and stores definitions of several authorization policies for several API calls to one or more applications executing on a set of associated machines. In some embodiments, the sever set can receive the policies through a web-based user interface (e.g., a web browser) or some other interface (e.g., an API interface that supports receiving policies from other applications). The server set in some embodiments allows these policies to be custom defined in terms of different sets of parameters for the different sets of applications that are used in the different deployment settings in which the server set is employed (e.g., for different tenants in a multi-tenant datacenter or different departments or divisions of a multi-department or multi-division entity).

Through one or more interfaces (e.g., web-based interfaces or other interfaces), the server set in some embodiments collects and stores parameters for evaluating the authorization policies to assess whether API calls should be authorized. For one or more sources (e.g., LDAP directories, etc.) in the datacenter(s), the server set in some embodiments has one or more data-source adapters that collect parameters from these data sources and store these parameters in order to evaluate the authorization policies to assess whether API calls should be authorized. The server set also allows such parameters to be entered through a web-based user interface.

The collected parameters in some embodiments are specific to each set of related machines (e.g., for each tenant in a multi-tenant datacenter or each department or division of a multi-department or multi-division entity) for which the server set defines and distributes policies. The server set in some embodiments updates these parameters dynamically in real time. Accordingly, in some embodiments, the server set uses, collects, and updates parameters for resolving policies dynamically and in a deployment specific manner (i.e., in a manner that can be context specific for each set of associated machines for which the server set is deployed). The dynamic and deployment-specific way that the server set collects and updates policy-resolving parameters greatly enhances the configurability of the server set in each deployment. This is because the server set not only allows custom policies to be defined for each deployment based on the deployment-setting specific parameters, but also allows these policies to be resolved based on dynamically changeable parameters for each specific deployment.

For each set of related machines, the server set in some embodiments stores the defined API-authorization policies, and collected parameters needed to resolve these policies, in a single hierarchical storage structure (such as a namespace) that can be accessed as a single runtime storage construct. The server set in some embodiments includes several modules for maintaining the policy and parameters in this runtime storage structure up to date. For instance, as mentioned above, the server set in some embodiments has one or more data-source adapters that receive and/or collect policy-resolving parameters for storage in the runtime hierarchical storage structure.

The server set in some embodiments identifies updates to parameters for evaluating the policies and stores these updates in this storage structure along with the authorization policies. In some embodiments, the runtime storage structure (e.g., the namespace) stores the policy for authorizing each API call as one or more lines of opcode (as one or more opcode expressions/statements). Each such policy is referred to as policy opcode in the discussion below. Also, policy operands in the discussion below refer to the parameters that are needed to resolve the policy opcodes for the API calls. The single storage structure stores such policy operands along with the policy opcodes. Policy operands can also accompany the API calls, or the API-authorization requests that are generated in response to such API calls.

In some embodiments, the server set distributes the defined policies and parameters to policy-enforcing local agents that execute near the applications that process the API calls. Different embodiments place the local agents in different positions with respect to their associated applications, as further described below. In some embodiments, the server set distributes different sets of policies and parameters to different local agents based on the policies that are relevant to the API-authorization processing for the applications associated with those agents.

From an associated application, a local agent receives API-authorization requests to determine whether API calls received by the application are authorized. In response to such a request, the local agent uses one or more parameters associated with the API call to identify a policy stored in its local policy storage to evaluate whether the API call should be authorized. To evaluate this policy, the agent might also retrieve one or more parameters from the local policy storage.

The local agent then uses the received or retrieved parameters to evaluate the retrieved API-authorization policy in order to determine whether the API call should be approved or rejected. Based on this evaluation, the local agent then sends a reply to the application that sent the API-authorization request, to specify whether the API call should be approved or rejected. In some embodiments, the applications send the API-authorization requests as RPC (Remote Procedure Call) messages, and the local agents send their replies to these requests as RPC reply messages.

In other embodiments, the authorization module sends its API-authorization requests to the local agent through other mechanisms (such as IPC (inter-process communication) messages) that initiate above the network stack. Also, in some embodiments, the API-authorization request does not come to the local agent from the application to which the API call is directed. For instance, in some embodiments, a first application intercepts an API call intended for a second application, and sends a request (e.g., through RPC, IPC, etc.) to authorize this API call to the local agent. When the local agent authorizes this request, the first application then passes the API call to the second application, while discarding this call when the local agent rejects this call. In some embodiments, the first application not only intercepts API calls to obtain authorization for these calls, but also intercepts these calls to first have them authenticated by a separate authentication service.

In some embodiments, the local agents are used to authorize API calls for both application domain logic (also called core logic or business logic) and application infrastructure logic. In other embodiments, the local agents are used to authorize API calls for application infrastructure logic but not application domain logic. Applications typically include application domain logic and application infrastructure logic. Application domain logic captures the domain rules for creating, storing, and manipulating data relating to the core functions of the application. For instance, in banking, domain logic captures the logic to calculate the monthly interests for bank accounts, prepare and calculate a mortgage offer (involving complex formulas using credit scores and other information available), or simply move funds between two accounts. In banking, domain logic would also be responsible for preparing the web page contents as customers access their bank accounts over the web.

Application infrastructure logic provides support functions that allow the application domain logic to run, and to run reliably and scalably. Examples of such support functions include integration functions with other applications (various protocol implementations), configuration management (logic might have configuration options), monitor and alert functions (to detect when the domain logic is down), schedule and thread management facilities (to run several logic instances is parallel for improved scalability), etc. While these functions are critical, they are not typically a concern of the application domain logic. Hence, decoupling API authorization for infrastructure logic simplifies the application code and allows the application's code to focus on the matters relevant to the application's core functions.

FIG. 1 illustrates a policy enforcement system 100 of some embodiments of the invention. As shown, this system includes a server set 105, several host computers 110, a first set of applications 115 executing on the host computers 110, several local agents 120 executing on the host computers, and a second set of applications 125 executing on the same host computers 110 or other devices or computers 130. The various computers and devices of the system 100 communicatively connect to each other through a network 180, which can include one or more local area networks, wide area networks, wireless networks, a network of networks (e.g., Internet), etc.

The host computers 110 in some embodiments operate in one or more datacenters. In some embodiments, the server set 105 includes one or more servers that operate in the same datacenter as the host computers 110, while in other embodiments the server set operates in a different datacenter than one or more of the host computers. The server set 105 acts as a logically centralized resource for defining, storing, distributing and enforcing policies for authorizing API calls to the first set of applications 115 that execute sets of associated machines (e.g., VMs, containers, etc.) that execute on the host computers 110. In some embodiments, each set of associated machines is associated with one entity (e.g., belongs to a tenant in a multi-tenant datacenter or to one division of a corporation in a corporate datacenter). Accordingly, the server set can be used to define, store, distribute and enforce different sets of policies for authorizing API-calls for the set of applications 115 that belong to different entities in one or more datacenters.

In some embodiments, some of these applications execute on virtual machines (VMs) or containers on the host computers, while other applications execute over the operating systems of the host computers. Also, in some embodiments, some of the API calls to a set of associated applications 115 come from other applications in the same set, while other API calls to the application set come from other applications (e.g., applications 125). The second set of applications 125 execute on host computers or devices inside or outside of the server set's datacenter(s) for which the server set does not enforce policies.

To define and store policies, the server set 105 in some embodiments receives and stores definitions of several authorization policies for a number of API calls to a set of associated applications. In some embodiments, the sever set can receive the policies through a web-based user interface (e.g., a web browser) or some other interface (e.g., an API interface that supports receiving policies from other applications). The server set in some embodiments allows these policies to be custom defined in terms of different sets of parameters for the different sets of applications that are used in the different deployment settings in which the server set is employed (e.g., for different tenants in a multi-tenant datacenter or different departments or divisions of a multi-department or multi-division entity).

Through one or more interfaces (e.g., web-based interfaces or other interfaces), the server set 105 in some embodiments receives parameters for evaluating the policies. For one or more policy operand data sources 132 (e.g., from tenant LDAP directories, etc.) in the datacenter(s), the server set in some embodiments has one or more adapters that collect parameters from these data sources and store these parameters in order to evaluate the authorization policies to assess whether API calls should be authorized. The server set also allows such parameters to be entered through a web-based user interface.

For each set of related applications or machines (e.g., for each tenant in a multi-tenant datacenter), the server set in some embodiments stores the defined authorization policies and collected parameters in a single hierarchical storage structure 135. In some embodiments, the hierarchical storage structure allows each particular policy and a set of collected parameters associated with the particular policy to be retrieved by providing a location identifier (e.g., a path) that identifies a location in the hierarchical storage structure that stores the particular policy. In some embodiments, this location also stores the set of collected parameters for the particular policy. In other embodiments, this location either stores the set of collected parameters for the particular policy, or stores one or more location-identifiers for one or more locations in the hierarchical storage structure at which the set of collected parameters is previously stored in the structure. The hierarchical storage structure in some embodiments is a namespace that stores the policies and the parameters for resolving these policies for the set of related machines.

In some embodiments, each authorization policy is defined by policy opcode in the namespace, while the parameter set for this authorization policy is defined as policy operands that are associated with the policy's opcode and that are stored in the namespace. The policy opcodes in some embodiments are written in a declarative language. Also, in some embodiments, the policy operands are written in a language-independent, structured format, such as JSON (JavaScript Object Notation) format or YAML (initially, "Yet Another Markup Language" and later, YAML Ain't Markup Language). Typically, such formats (e.g., JSON, YAML, etc.) are human readable. Alternatively or conjunctively, in some embodiments, the policy operands are expressed in other formats, e.g., binary format, etc.

The server set in some embodiments identifies updates to one or more parameter sets (e.g., to one or more operands) for one or more one policies (e.g., policy opcodes), and stores these updates in the namespace. The server set in different embodiments employs different techniques for updating the policy operands. For instance, in some embodiments, the data source adapters of the server set identify operand updates by retrieving the updates from the data sources 132 of the operands through data pull operations and/or by receiving the updates from these data sources 132 through data push operations.

In some embodiments, the server set distributes the defined policies and parameters to local agents 120 that enforce these API-authorization policies for the applications 115, and these local agents 120 store the distributed policies and parameters in their local policy/parameter store 150. In some of the embodiments that store the policies and parameters in a namespace, the server set distributes different portions of the namespace to different host computers based on the policies that are relevant to the API-authorization processing for the first set of applications 115 executing on the different host computers. The different portions that are distributed to the different host computers can be overlapping in some embodiments.

For instance, to a first computer, the server set 105 distributes a first portion of the namespace that comprises policies and parameter sets relevant for processing API calls to a set of applications executing on the first computer, while distributing a second portion of the namespace that comprises policies and parameter sets relevant for processing API calls to a set of applications executing on the second computer, with the first and second namespace portions differing in that at least one policy and at least one parameter set of the first portion is not in the second portion. These two namespaces can either have no policies or parameters in common, or have one or more policies and parameters in common. Each local agent 120 stores its local portion of the namespace that it receives from the server set 105 in its local policy/parameter store 150.

In some embodiments, the server set 105 uses a push model to distribute the policy/parameters (e.g., the relevant namespace portions) to each local agent 120. In other embodiments, the server set uses a pull model to distribute the policy/parameters. For instance, in these embodiments, once a local agent initializes, it queries the server set for policies and parameters relevant to it. In these embodiments, the local agent also periodically polls the server set to determine whether policies or parameters that the local agent previously received have been updated on the server set, and thereby need to be copied on the local agent's portion of the namespace. When such updates exist, the local agent retrieves them from the server set or receives them as part of its querying poll.

The local agent 120 executing on a host computer 110 receives requests to determine whether API calls received by one or more applications 115 executing on the host computer are authorized. The local agent in some embodiments receives each request to authorize an API call to an application from an authorization module of that application. In some embodiments, the authorization module of an application sends its API-authorization requests to the local agent through an RPC (Remote Procedure Call) message that is forwarded to the local agent by a network communication stack (e.g., the network stack executing on the application's host computer, the application's VM, or the application's container). In other embodiments, the authorization module sends its API-authorization requests to the local agent through other mechanisms (such as IPC (inter-process communication) messages) that again, initiates above the network stack.

In response to such a request, the local agent 120 uses one or more parameters associated with the API call to identify a policy (e.g., policy opcode) stored in its local policy storage (e.g., stored in its local namespace) to evaluate in order to determine whether the API call should be authorized. The received API-authorization request contains one or more parameters associated with the API call (e.g., one or more parameters that identify the API call, its type and/or other metadata about the API call). In some embodiments, at least one parameter in the request is received by the application in the API call.

For instance, in some embodiments, the application receives the API call as part of the payload of one or more data messages (e.g., data packets) that the application receives, and at least one parameter in the first parameter set is a parameter that is part of the payload of the received data message(s). One or more modules (i.e., processes) are typically used to extract this payload for processing. For example, a layer 4 security process (e.g., a transport layer security (TLS) process) might have to decrypt one or more packet payloads in order to obtain the API call and its parameters in plaintext format (as opposed to the cipher text format in which they are received).

To evaluate the identified policy for the API call, the agent might also retrieve one or more parameters (e.g., operands) from the local policy storage (e.g., from its copy of the namespace). The local agent then uses the received or retrieved parameters to evaluate the retrieved API-authorization policy in order to determine whether the API call should be approved or rejected. For instance, in some embodiments, the retrieved policy opcode includes one or more rules that specify one or more conditions for approving or rejecting the API calls. The agent resolves these conditions based on the received or retrieved parameter(s) associated with the API call (e.g., the agent determines that one or more received or retrieved parameters match a condition specified by the policy opcode for rejecting an API call).

Based on this evaluation, the local agent then sends a reply to the application that sent the API-authorization request, to specify whether the API call should be approved or rejected. In some embodiments, the local agent sends its reply to the API-authorization request as an RPC reply message. When the API call is approved, the particular application then performs the operation associated with the API call, and if necessary, returns an output to the source of the API call (i.e., to the module that sent the API call) to the particular application. On the other hand, when the API call is rejected, the particular application sends the message to the source of the API call to reject the call, or simply discards this call without providing a response to the source of the API call.

In some embodiments, the local agents operate in the same failure domain as the machines on which the applications execute. For instance, when an application executes on a virtual machine (VM) or container, the local agent in some embodiments executes on the same VM or container as the application. In other embodiments, the local agent does not execute on the same VM or container as its associated application, but executes on the same host computer as the application's VM or container.

In some embodiments, each local agent is associated with just one application that executes on the same computer, same VM or same container as the local agent. In other embodiments, one local agent in some embodiments can be shared by multiple applications that execute on the same VM, container, or host computer as the agent. However, in a multi-tenant datacenter, some embodiments do not allow local agents to be shared by applications executing on different tenants' computers, VMs or containers. Other embodiments, on the other hand, allow one local agent to be used by different applications of different tenants.

Some embodiments have the local agents operate within the same failure domain as the applications (e.g., micro service applications) in order to ensure that the policy functionality remains highly available and responsive at all times. Having local agents authorize API calls is very useful for micro-service applications as it provides a mechanism to implement complex API-authorization policies without adding to the micro-service applications the functional complexity needed to process rich API-authorization policies. This approach is also useful as it extracts the API-authorization processing from the application's code base, and therefore makes this processing easier to change dynamically over time. It also allows API-authorization processing for a large number of applications in a datacenter to be controlled in a logically centralized way through the server set.

As mentioned above, the server set in some embodiments distributes policies and parameters to local agents so that they can evaluate API-authorization requests locally. Conjunctively or alternatively, the server set in some embodiments also processes API-authorization requests from some or all of the applications 115. For instance, in some embodiments, it might not be feasible or desirable to perform the API-authorization on the same computer or failure domain as the application, e.g., the operating system restricts the type of agents installed, or the API-processing application executes on devices with limited computational resources (e.g., IoT (Internet of Things) devices). Also, in some embodiments, the response time for the API-authorization decision is not as crucial as the requested operations can be gradually rejected, or a limited access to the application can be provided until the API calls are authorized.

Accordingly, in some embodiments, an API-authorization module of an application executing on a computer sends an API-authorization request (e.g., as an RPC message) to a local agent on the same computer, and this local agent forwards this request (e.g., as another RPC message) to the server set. In other embodiments, the API-authorization module of the application sends the API-authorization request (e.g., as an RPC message) directly to the server set.

The received API-authorization request contains a first parameter set associated with the API call. As before, the first parameter set includes at least one parameter that identifies the API call, its type and/or other metadata about the API call, and can include one parameter that was received as part of the API call. After receiving the API-authorization request, the server set then uses one or more parameters in the first parameter set to retrieve a policy (e.g., policy opcode) related to the API call from its policy/data storage 135 (e.g., from its namespace for the set of associated machines to which the application belongs). To evaluate this policy, the server set might also retrieve one or more parameters from its policy storage 135 that are relevant for assessing the retrieved policy (e.g., retrieve policy operands from its namespace for the set of associated machines to which the application belongs). This retrieved set of parameters serves as a second set of parameters associated with the API call.

The server set then uses the received or retrieved parameters to evaluate the retrieved API-authorization policy in order to determine whether the API call should be approved or rejected. For example, in some embodiments, the server set resolves one or more conditions specified in the retrieved policy opcode based on one or more received or retrieved parameters (e.g., determines that one or more received or retrieved parameters match a condition specified by the policy opcode for rejecting an API call). Based on this evaluation, the server set then sends a reply (e.g., an RPC reply message) to the local agent or the application's authorization module to specify whether the API call should be approved or rejected. When this response is sent to the local agent, this agent then relays this message (e.g., as an RPC reply message) to the application's API-authorization module.

As mentioned above, the local policy and data storage 150 and the server policy and data storage 135 of some embodiments are hierarchical namespaces that store both policy opcode and policy operands that are needed for resolving the policy opcodes (i.e., both the code and the data on which the code operates). In some embodiments, the namespace is a document database in that it has no tables and instead is laid out as a single hierarchical document. This document forms one global namespace that holds all the data and policies. For instance, the following namespace structure is a hierarchical layout of a policy-and-document database that stores three JSON data documents and two policies:

/a/b/doc_1.json
/a/b/doc_2.json
/c/d/doc_3.json
/d/policy_A
/e/f/policy_B

In this example, there are two JSON documents at namespace location '/a/b' and a third JSON document at '/c/d', while the two policies are saved at '/d' and '/e/f'.

As a namespace merges the data and policies into one global hierarchical layout, database clients can access a nested portion of the namespace simply by requesting data by its fully qualified name. Moreover, to access a portion of policy operand document 1, the client can simply request the data with name:

/a/b/doc_1/some_portion.

The same applies to policies: the namespace evaluates the policies on-the-fly when client accesses the namespace. That is, client can simply access the results of a "policy evaluation" by referring the policy and its relevant portion. For instance, a client can request/e/f/policy_B/some_computed_result, /e/f/policy_B/some_computed_result, which would make title database take the source of code of the policy B, compute the policy using any data necessary that the policy may need underneath and then pass the requested portion of the policy results back to the client.

Figure 2:
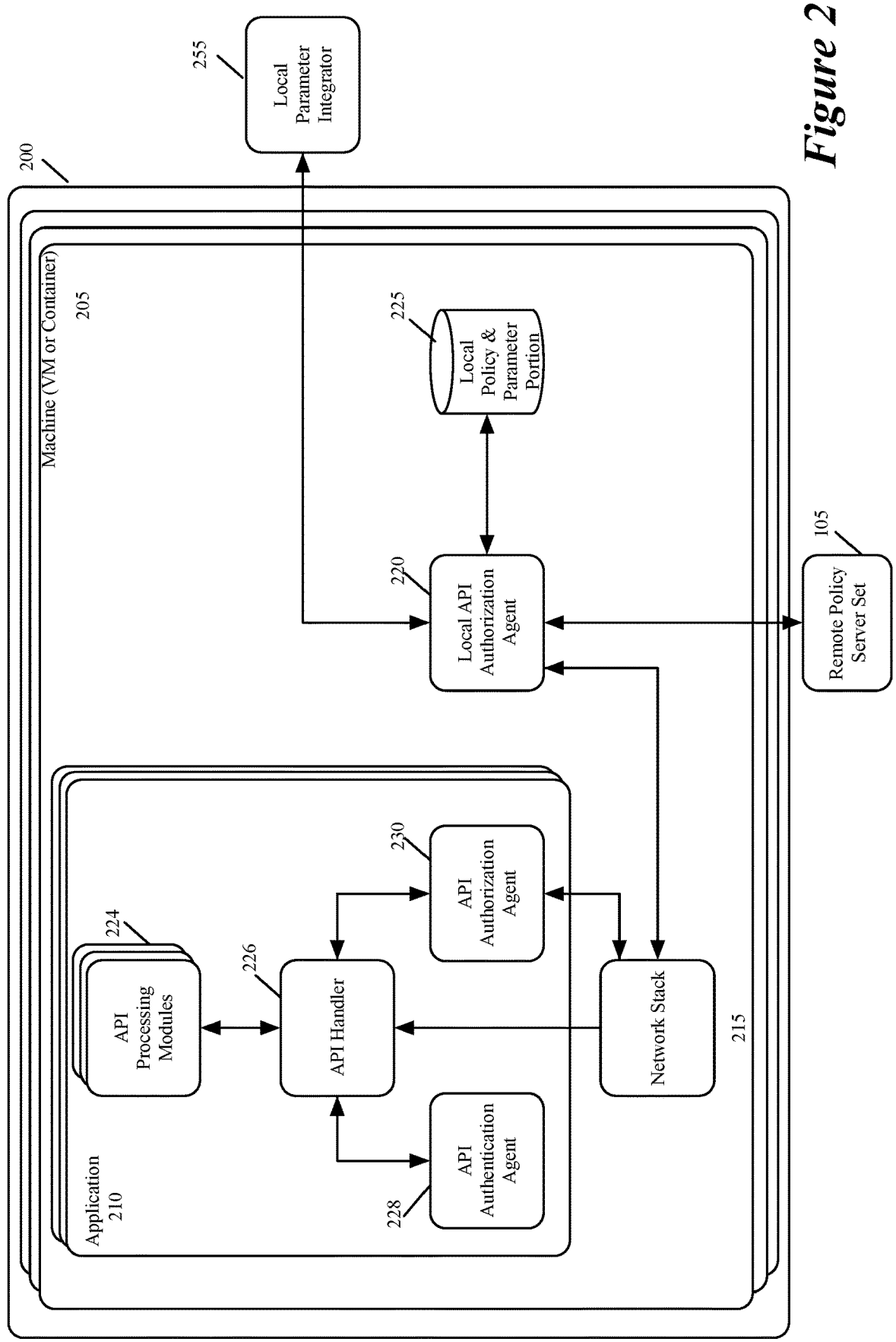
FIG. 2 conceptually illustrates the host-side software architecture of the API-authorization system.

FIG. 2 illustrates the host-side software architecture of the API-authorization system 100 of some embodiments. Specifically, it illustrates a host computer 200 on which multiple machines 205 (e.g., multiple VMs or containers) execute. On each machine 205, multiple applications 210 can execute to process API calls from other modules on the host computer 200 or on other host computers or devices in the same datacenter or outside of the datacenter.

In addition to these applications, each machine 205 also has a network stack 215 and a local API-authorizing agent 220. The network stack 215 is a software communication stack (e.g., TCP/IP stack) that implements a network communication protocol suite to allow the applications and processes of the machine 205 to communicate with each other, and with applications and processes executing outside of this machine (e.g., on the same host computer 200 or on other computers or devices). When the machine 205 is a container, its network stack is the network stack of the VM or operating system on which the container executes. Also, the network stack of a machine often connects with another module (e.g., a software switch) on the host computer, which, in turn, interfaces with a physical network interface card (NIC) of the host computer.

One set of communications that the network stack 215 facilitates is the communication between an application's API-authorizing agent 230 on an application and the local API-authorizing agent 220. As further described above and below, the network stack passes RPC data messages between the application agent 230 and the local agent 220. The local agent 220 enforces API-authorization policies for the applications that execute on the machine 205. Specifically, from the application API-authorizing agents 230 of the machine 205, the local API-authorizing agent 220 receives API-authorization requests for different APIs that the applications 210 receive.

For each such request, the local agent 220 retrieves the API-authorization policy associated with the request (i.e., associated with API call to which the request pertains) from its local policy and parameter storage 225. The local agent 220 retrieves this policy by using one or more parameters that are associated with the API call and that were received with the API call or the API-authorization request. From the policy/parameter storage, the local agent 220 can also retrieve one or more parameters for evaluating this policy.

The local storage 225 stores policies and parameters that the server set 105 has previously provided to the local agent 220. In some embodiments, this storage also stores parameters that the local agent previously receives from a local parameter integrator 255. This integrator allows an entity in the datacenter (e.g., a tenant or a department) to separately provide some or all of the parameters for evaluating the API-authorization policies. For instance, this integrator allows the entity to export highly confidential parameters into an API-authorization policy enforcement node without providing these parameters to the server set 105.

The local agent 220 then evaluates the retrieved policy based on parameter(s) received with the API-authorization request, or retrieved from the local storage 225. Based on its evaluation, the local agent then determines whether the API call should be approved or rejected. The local agent then sends the application API-authorizing agent 230 that sent the API-authorization request, a reply to specify whether the API call should be approved or rejected. In some embodiments, the API-authorizing agent 230 sends the API-authorization requests as RPC (Remote Procedure Call) messages, and the local agents send their replies to these requests as RPC reply messages.

In the example illustrated in FIG. 2, each machine 205 has its own local API-authorization agent 220. Each such local agent 220 on a machine 205 can process API-authorization requests from one or more applications 210 executing on the machine. Having the local agent 220 operate on the same machine as its associated application 210 is beneficial as in this way, both these components operate in the same failure domain, which improves agent's availability and its speed of processing API-authorization requests. However, in other embodiments, the applications on multiple machines on a host computer share the same local agent. For instance, in some embodiments, the local agent operates as a service VM or container on a host computer, and applications on multiple VMs and/or containers use this agent to have their API calls authorized. Instead of having the local agent operate as a service VM or container in the user space, other embodiments have the local agent operate as another type of process on the host computer that is accessed by multiple applications on multiple VMs and/or containers on a host computer.

As shown in FIG. 2, each application has an API handler 226, an API-authentication agent 228, and one or more API processing modules 224, in addition to the API-authorizing agent 230. An API processing module 224 is a module (e.g., an object) that performs an operation based on an API call to it. The API authentication agent 228 is the module that authenticates the identity of the API-call's source (e.g., validates the access credentials associated with the API call). When the API call is authenticated, the API authorization agent 230 determines whether the API call is authorized (i.e., whether the operation associated with the API call should be performed). The API handler 226 is the module that initiates the authentication operation and authorization operation for each API call. In some embodiments, the API handler is implemented by authentication and/or authorization code of the API processing modules (e.g., this handler is implemented in some embodiments by authentication and authorization code within each API processing object of an application).

Figure 3:
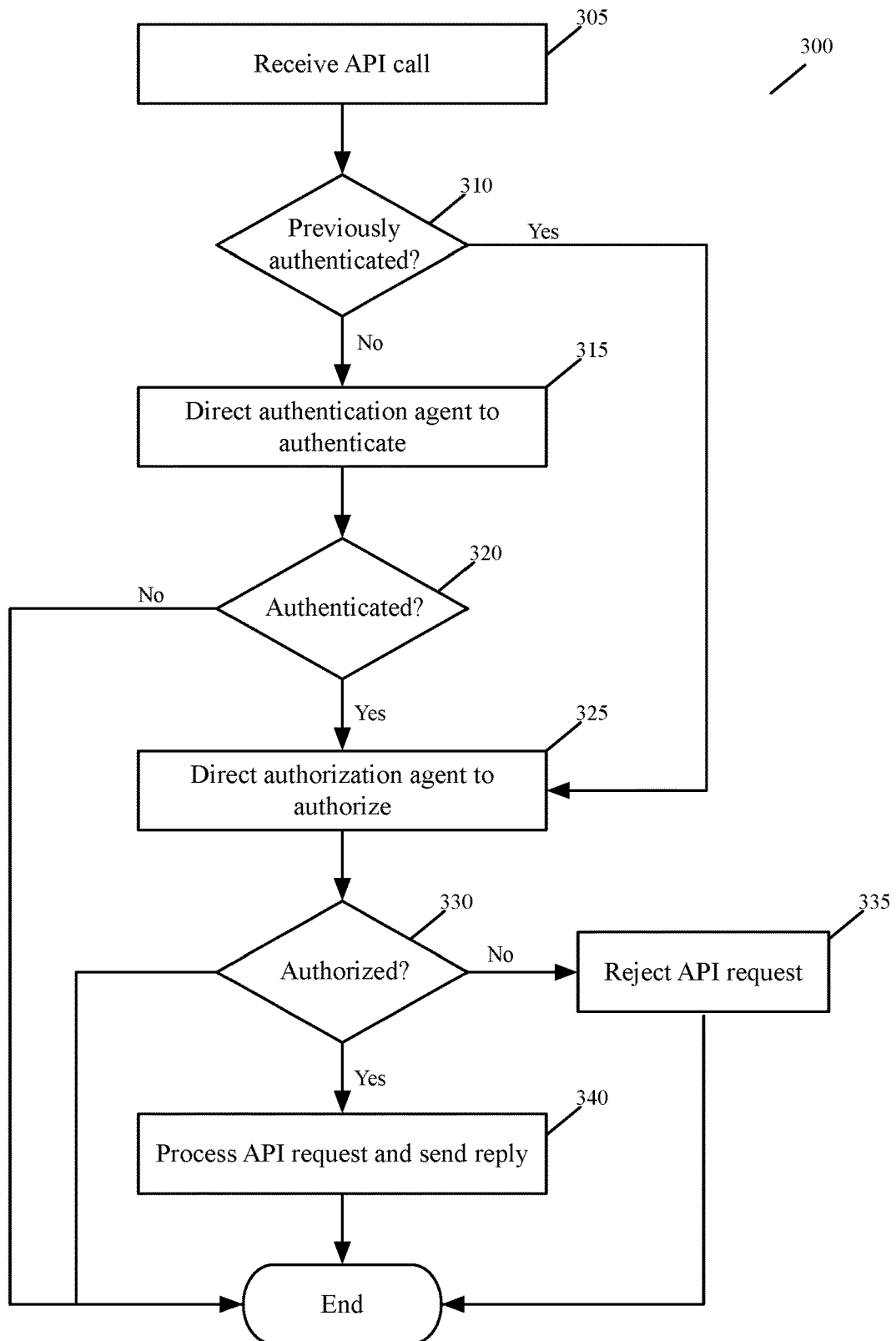
FIG. 3 illustrates a process that an application performs when it receives an API call.

To further explain the operations of the components of the application 210, FIG. 3 illustrates a process that an application 210 performs when it receives (at 305) an API call. In some embodiments, the application 210 performs this process only for an API call that relates to an application infrastructure operation. In other words, an application 210 does not call the local agent 220 in some embodiments for API calls that relate to an application's core logic operations. In other embodiments, the local agent 220 handles API-authorization requests for both core logic API calls and infrastructure logic API calls.

When an API call is received, it has to be authenticated in some embodiments to validate the identity of the source of the API call. The API handler 226 uses the API authentication agent 228 to authenticate the identity of the source of the API call, e.g., to authenticate the credential set (e.g., certificate, username and/or password) accompanying the API call. Accordingly, as shown, the API handler 226 initially determines (at 310) whether the received API call is part of a communication session that was previously authenticated by the authentication agent 228 (e.g., part of a communication session that the authentication agent 228 previously stored a cookie). If so, the process transitions to 325, which will be further described below. Otherwise, when the API call is not part of a communication session that was previously authenticated, the API handler 226 directs (at 315) the authentication agent 228 to authenticate the API call. In some embodiments, each API call has to be independently authenticated irrespective of whether any prior API call in the same communication session has been authenticated.

In some embodiments, the API authentication agent 228 authenticates (at 315) the identity of the source of the API call by authenticating the credential set that is part of the API call. The application receives an API call as part of one or more data messages, each of which has a header and a payload. The payload of each such message contains all or part of the API call and one or more associated parameters, e.g., parameters that provide the credentials (e.g., username, password, user identifier, group identifier, certificate, etc.) of the source of the API call.

In some embodiments, the API authentication agent uses modules (e.g., third-party credential authenticating programs) executing outside of the application 210 to authenticate the API call. In these embodiments, the authentication agent 228 passes a set of source-identifying parameters that identifies the source of the API call to the external module, so that this module can authenticate the source of the API call. One or more parameters in this set can be parameters that were received with the API call.

After directing (at 315) the authentication agent to authenticate the source of the API call, the API handler (at 320) determines whether the authentication agent 228 reply indicates that the API call has been authenticated. If not, the API handler discards the API call and the process 300 ends. In some embodiments, the API handler 226 not only discards the API call but also sends a reply to the source of the API call to reject the call.

On the other hand, when the authentication agent 228 authenticates the source of the API call, the API handler 226 directs (at 325) the application API-authorizing agent 230 to authorize the API call. In response, the application agent 230 sends an API-authorization request to the local API-authorizing agent 220. To do this, application agent 230 generates (at 325) an RPC message to the local agent 220 to pass along this request with information about the API call (e.g., one or more parameters that describe the API call and one or more parameters associated with this call). The network stack 215 passes this RPC message to the local agent 220.

After receiving the API-authorization request from application authorizing agent 230, the local agent 220 uses (at 325) one or more of the received parameters to retrieve a policy for authorizing the API call from the local storage 225. In the embodiments in which the local storage 225 stores the policy and associated parameters in a namespace, the local agent uses one or more of the parameters in the API-authorization request to retrieve policy opcode related to the API call from the namespace. To evaluate this policy opcode, the agent might also retrieve parameters (e.g., policy operands) from the local storage (e.g., from the namespace) that are associated with the retrieved policy.

The local agent then uses the received parameter set and/or retrieved parameter set to evaluate the retrieved API-authorization policy (e.g., the retrieved opcode) in order to determine whether the API call should be approved or rejected. In the embodiments that express each policy in terms of policy opcode that has one or more rules that specify one or more conditions for approving or rejecting the API calls, the agent resolves these conditions based on the received and/or retrieved parameters. For instance, in some embodiments, the agent determines that one or more parameters in the received parameter set and/or retrieved parameter set match a condition specified by the policy opcode for rejecting the API call. In some embodiments, the conditions can specify reasons for allowing an API call.

Some API-authorization policies are resolved only by reference to the received parameter sets (i.e., only specify conditions that just need the received parameter sets to be resolved). Other API-authorization policies are resolved only by reference to the retrieved parameter sets (i.e., only specify conditions that just need the received parameter sets to be resolved). Still other API-authorization policies are resolved by reference to both the received and retrieved parameter sets (i.e., specify conditions that need both the received and retrieved parameter sets to be resolved).

After evaluating the retrieved policy, the local agent then sends (at 325) a reply message to the application API-authorizing agent 230 to return the results of its evaluation (e.g., to specify whether the API call should be allowed or rejected). In some embodiments, this reply message is an RPC reply message that is directed back to the application agent 230 through the network stack 215. Once the application agent 230 receives the reply from the local agent 220, it passes the local agent's approval or rejection of the API call to the API handler.

After directing (at 325) the authorization agent to authorize the API call, the API handler (at 330) determines whether the application API-authorizing agent's reply indicates that the API call has been authorized. If not, the API handler discards the API call and the process 300 ends. In some embodiments, the API handler 226 not only discards the API call but also sends a reply to the source of the API call to reject the call.

On the other hand, when the authorization agent 230 returns a reply that indicates that the API call has been approved, the API handler 226 directs (at 340) the API-processing module 224 that is associated with the API call to perform the operation associated with the API call and to provide a reply message to the source of the API call to indicate the completion of this operation. In some cases, this operation requires an output to be generated and returned to the source of the API call or to some other destination. In these cases, the API processing module generates this output and provides this output to the source of the API call or to the other destination. After 340, the process 300 ends.

One of ordinary skill will realize that the process 300 is implemented differently in other embodiments. For instance, the API-processing application does not perform the authorization/authentication check operations of the process 300. Instead, a proxy authentication/authorization application performs these operations. In these embodiments, the proxy first application intercepts an API call intended for a second application, and sends a request (e.g., through RPC, IPC, etc.) to authorize this API call to the local agent. When the local agent authorizes this request, this proxy first application then passes the API call to the second application, while discarding this call when the local agent rejects this call. In some embodiments, the first application not only intercepts API calls to obtain authorization for these calls, but also intercepts these calls to first have them authenticated by a separate authentication service.

Also, the process 300 discards an API call when this call is not authenticated. In other embodiments, the process 300 does not discard such an API call. For instance, in some embodiments, the process 300 passes the authentication failure of an API call to the local agent. This agent then uses this failure like a received parameter to resolve one or more conditions associated with the policy (retrieved from its namespace portion) that it evaluates to determine whether to authorize the API call.

Figure 4:
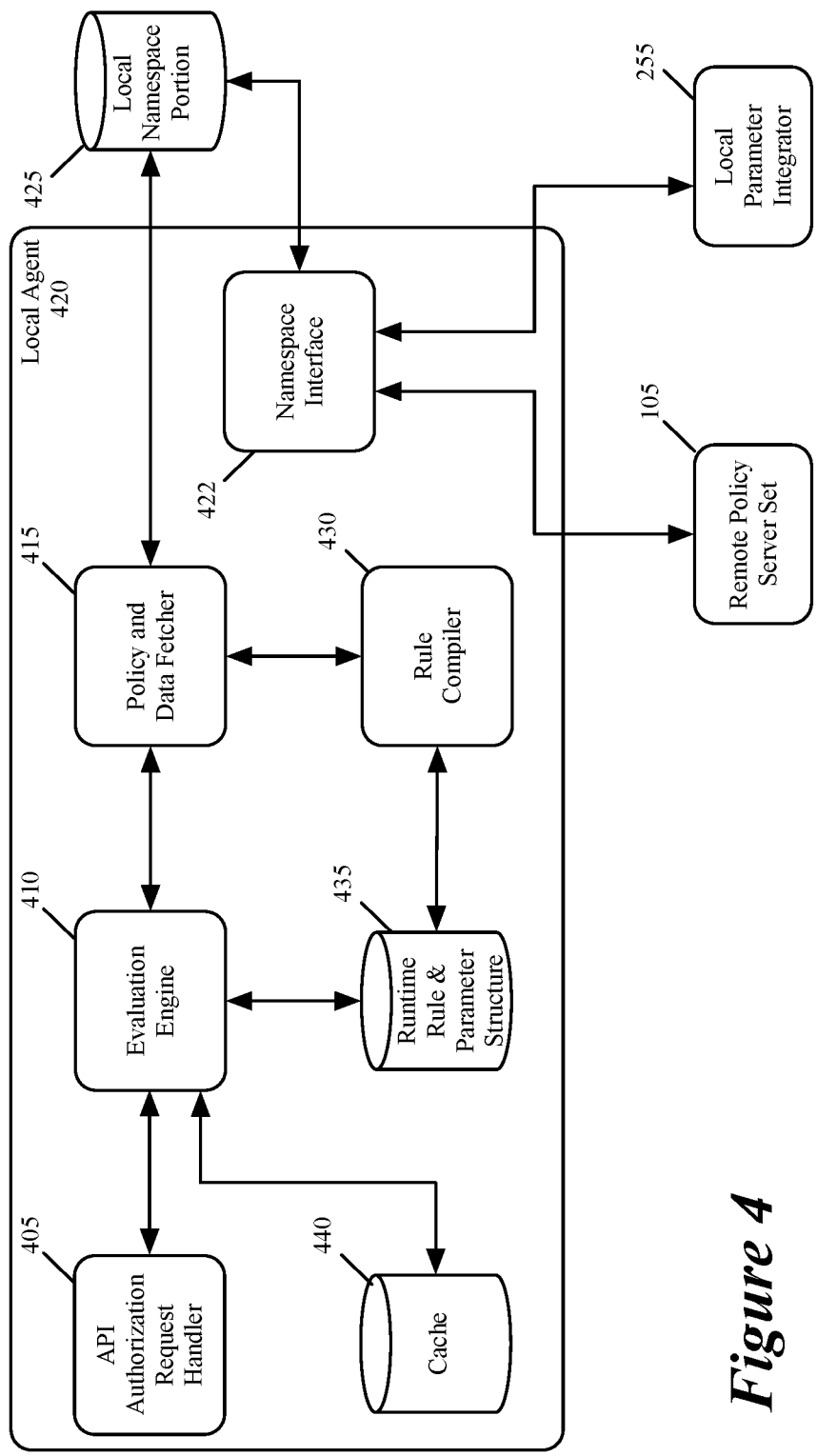
FIG. 4 conceptually illustrates the architecture of a local agent.

FIG. 4 illustrates a more-detailed view of a local agent 420 of some embodiments. In this example, the local agent 420 uses a local namespace portion 425 as the local policy and data storage 225. This namespace contains both (1) policy opcodes to evaluate API calls to determine whether they should be authorized, and (2) operands to use when evaluating and resolving the opcodes. In some embodiments, the namespace portion 425 contains the policy opcodes and operands needed for the API calls that are received by one or more applications on the agent's host that use the local agent. In other embodiments, the local agent has a different namespace portion for different applications.

The local agent 420 has a namespace interface 422 that receives and stores the namespace portion and updates to all or part of this portion from the remote policy server set 105. This interface also receives policy operands from local parameter integrator 255, which, as mentioned above, can be used in some deployments to store policy operands in the namespace that are not provided to the server set 105 (e.g., to maintain the confidentiality of such policy operands). Upon the initialization of the local agent 420, the namespace interface 422 in some embodiments initially queries the server set to obtain the namespace(s) for the applications that will use the local agent. Also, in some embodiments, the namespace interface 422 periodically polls the server set to determine whether any policy or operand in its namespace has been added, deleted or modified, and if so, the namespace interface updates its local namespace portion 425 to reflect this change (e.g., to download any new and/or modified policy and/or operand and store the downloaded policy and/or operand in the namespace portion).

Figure 5:
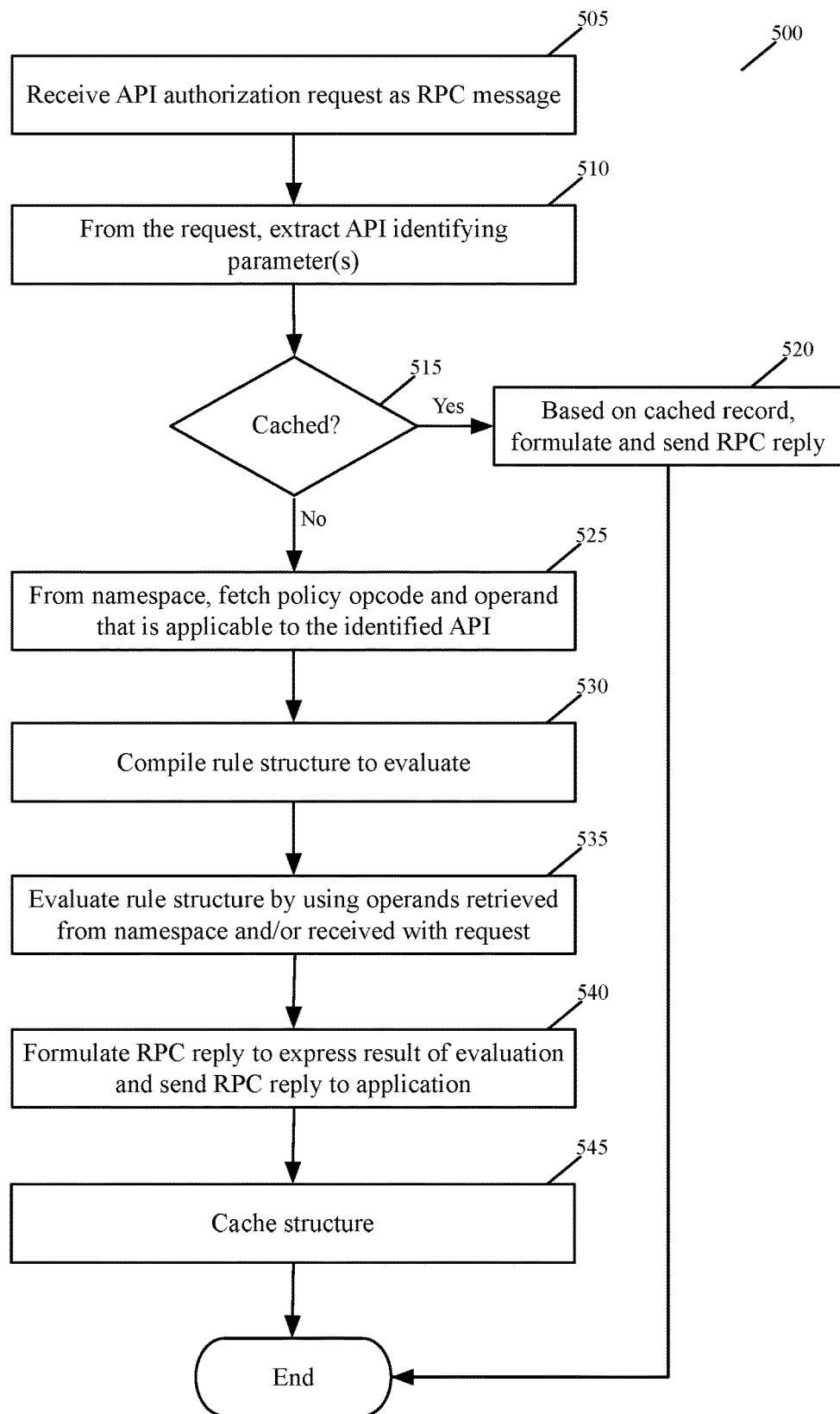
FIG. 5 illustrates a process that the local agent performs when it receives a request to authorize an API call from an API-authorizing agent of an application that executes on the same host as the local agent.

In addition to the namespace interface 422, the local agent 420 includes a request handler 405, evaluation engine 410, policy and data fetcher 415, and rule compiler 430. The operations of these modules will be described by reference to FIG. 5, which illustrates a process 500 that the local agent 420 performs when it receives a request to authorize an API call from an API-authorizing agent 230 of an application 210 that executes on the same host as the local agent 420.

As shown, the process 500 starts (at 505) when the agent's API-authorization request handler 405 receives an API-authorization request from the application's agent 230. This request is received in some embodiments as an RPC message that includes a set of parameters associated with the API call that the application has received. In some embodiments, this parameter set includes a parameter that identifies the API call and one or more metadata parameters associated with the API call. Also, in some embodiments, this parameter set includes one or more parameters that the local agent needs to resolve policy opcode that is associated with the API call and that is retrieved from the local namespace portion 425 by the local agent. Accordingly, after receiving the RPC message, the handler extracts (at 510) this parameter set from the RPC message's payload and provides this parameter set to the evaluation engine 410. This parameter set identifies the API call as mentioned above.

The evaluation engine is responsible for evaluating policy opcode related to the API call (i.e., the API call specified in the API-authorization RPC message) based on one or more parameters received with the RPC message and/or retrieved from the local namespace. Before evaluating this opcode based on one or more associated parameters, the evaluation engine needs the policy and data fetcher 415 to retrieve from the local namespace portion 425 the policy opcode and operands applicable to the identified API call, and the rule compiler 430 to create a more optimal runtime rule and parameter structure 435 for the evaluation engine to process. The evaluation engine also stores compiled rule structures for prior API-authorization requests in a cache storage 440, so that it can forego retrieving and compiling the same policy opcode/operands when it subsequently receives the same API call.

In view of this functionality, after identifying (at 510) the API call associated with the received request, the evaluation engine determines (at 515) whether the cache storage 440 stores a reference to a rule structure for this API call that was previously compiled when the local agent received the same API-authorization request previously. In some embodiments, the cache 440 identifies each stored rule structure in terms of one or more parameters that are passed along with the API-authorization request to the local agent 420 by the API-authorization agent 230. Hence, in these embodiments, the evaluation engine determines whether the parameters passed along with the current request matches the parameters stored for the rule structures identified in the cache storage 440.

If so, the evaluation engine processes (at 520) this previously specified rule structure to formulate its decision, and then provides (at 520) its decision (i.e., its "authorization" or "rejection") to the request handler 405. At 520, the API handler then formulates an RPC reply message with this decision in its payload and sends this reply message to the authorization agent 230 that sent the request. After 520, the process 500 ends.

On the other hand, when the evaluation engine determines (at 515) that the cache storage does not store a reference to a previously defined rule structure for the API call identified in the received request, the evaluation engine directs (at 525) the policy and data fetcher 415 to retrieve from the local namespace portion 425 the policy opcode and operands applicable to the identified API call. As described above and further described below, the namespace is a hierarchical structure that stores policy opcode associated with an API call in a location (e.g., a path) in the structure that can be specifically identified based on the API call's identifier (e.g., the name associated with the API call). In some embodiments, this location also stores the operands needed for processing this policy opcode and/or stores a location identifier (e.g., the path) that specifies other location(s) in the namespace that store the operands needed for processing the policy opcode. Hence, in some embodiments, the fetcher 415 can easily identify the policy opcode and operands to retrieve by just using parameters associated with the API call.

After retrieving the policy opcode and one or more associated operands, the fetcher 415 directs (at 530) the rule compiler 430 to create a more optimal runtime rule and parameter structure 435 for the evaluation engine to process. As described above, the policy opcode for an API call includes one or more rules, with each rule expressing one or more conditions for rejecting (or allowing) the API call. In some embodiments, the optimal runtime rule and parameter 435 structure includes "prepared rules" that are generated by the compiler. Prepared rules are rules that are parsed from the retrieved, compiled and optimized policy opcode that is retrieved by the fetcher for the API call.

Prepared rules are ready for execution and thus require less effort to execute. In some embodiments, the prepared rules are expressed using an abstract syntax tree (AST). Some embodiments translate the AST into a sequence of executable instructions. These instructions are virtual instructions (not CPU instructions) that are easy to run fast, and even further optimize for speed. Some embodiments use known processes to compile and process prepared rules from declarative language code. Some of the known processes are described in Handbook of Automated Reasoning by Alan Robinson and Andrei Voronkov.

Once the rule compiler creates (at 530) the more optimal rule structure, it notifies (at 535) the evaluation engine 410 directly or through the fetcher 415. The evaluation engine then processes (at 535) the rules in this rule structure. In some embodiments, the evaluation engine uses the parameters retrieved from the namespace and/or received with the API request to resolve these rules (e.g., conditions specified by the rules).

After processing (at 535) the rule structure, the evaluation engine 410 provides its decision with respect to the API call (i.e., the "authorization" or "rejection" of the API call) to the handler 405. At 540, the handler then formulates an RPC reply message with this decision in its payload and sends this reply message to the authorization agent 230 that sent the request. Next, at 545, the evaluation engine stores in the cache 440 a reference to the optimized rule structure that it created at 530. This cached result can be kept as long as the retrieved policy opcode does not change. That way, the evaluation engine can skip the parsing/compiling/optimization part (which can be more time consuming) and quickly start executing with minimal effort. As mentioned above, the evaluation engine 410 stores the cached rule structure by using a reference that is associated with one or more parameters that were received with the API call or the API-authorization request. After 545, the process ends.

In some embodiments, the process 500 not only caches the optimized rule structure for an API call's retrieved policy, but also caches the decisions that it reaches in processing the rule structure for a particular set of parameters. However, as each decision is dependent on the set of parameters that can dynamically change or can resolve the rules differently at different times or under different conditions, the process has to ensure that the previously cached decisions are still valid at a later instance in time when the API call is received again.

As mentioned above, the local agents in some embodiments are used to authorize API calls for both application domain logic and application infrastructure logic, while in other embodiments, the local agents are used to authorize API calls for application infrastructure logic but not application domain logic. Also, as mentioned above, decoupling API authorization for infrastructure logic simplifies the application code and allows the application's code to focus on the matters relevant to the application's core functions. This is especially the case because while infrastructure functions are critical, they are not typically a concern of the application domain logic.

For instance, in banking, it is the infrastructure part of the application that is responsible for maintaining micro-services' connections to an account database holding the actual account data (there could be many of those), providing the necessary HTTP facilities to allow the customers' browsers to retrieve their account contents (customers would expect SSL, for instance), as well as providing connectivity between micro-services (modern applications include several micro-services which then together form the application).

Both core logic and infrastructure parts require authorization in their operations. However, the type of authorization implemented is different: core logic implements authorization decisions over the core data and operations, while the infrastructure parts implement authorization decisions for the functionality they provide.

This implies that core logic is likely to implement authorization decisions that are fundamentally tied to the logic being implemented. For instance, in banking, there are restrictions about the mortgage offer approvals, between which account transfers can be moved without further security inspection (bank internal transfers are less risky compared to transfers to other banks), or between which kind of accounts fund transfers are allowed to begin with (a savings account could have restrictions for the number of transfers done per month). Even the size of the transfer itself is likely to affect the authorization decision.

Similarly, in healthcare, the core logic is the one that is responsible for health care data and operations over it: creation and filling prescription is likely to involve several authorization steps that are tied to the processing of the prescription data. For instance, heavy painkillers are likely to have more strict authorization logic in place to allow the creation of the prescription to begin with.

On the contrary, authorization within the infrastructure parts of the application and micro-service revolve around the infrastructure level entities. The authorization decisions are about whether a micro-service can talk to another, which micro-service API calls can invoke, or whether a micro-service can open a connection to a particular database instance and read a particular table. For business logic, these are low-level details that are typically invisible to the end user.

Application infrastructure level authorization is also relevant and related to the managing of the application and micro-service as whole. For example, a micro-service instance might run inside a VM and the type of a micro-service is likely to affect who (and when) can access the VM. For instance, it is common to block all access by default and allow access only on an as-needed basis. In that case only the people actively resolving an incident related to application are allowed to access the VM and hence the application deployment. While this does not concern the application instance itself (a process running a micro-service instance is not responsible for managing the VM the process runs within), these authorization decisions can be considered to be part of application infrastructure authorization.

As mentioned above, the server set 105 in some embodiments collects and updates parameters for resolving policies dynamically and in a deployment specific manner (i.e., in a manner that can be context specific for each set of associated machines for which the server set is deployed). This allows policies to be resolved based on conditions and dynamically changing parameters that are specific to each deployment. As further described below, the server set allows the values for policy operands to dynamically change because it allows local agents to receive (through push operations or pull operations) such changes for the policy operands in the respective namespaces of the local agents.

Figure 6:
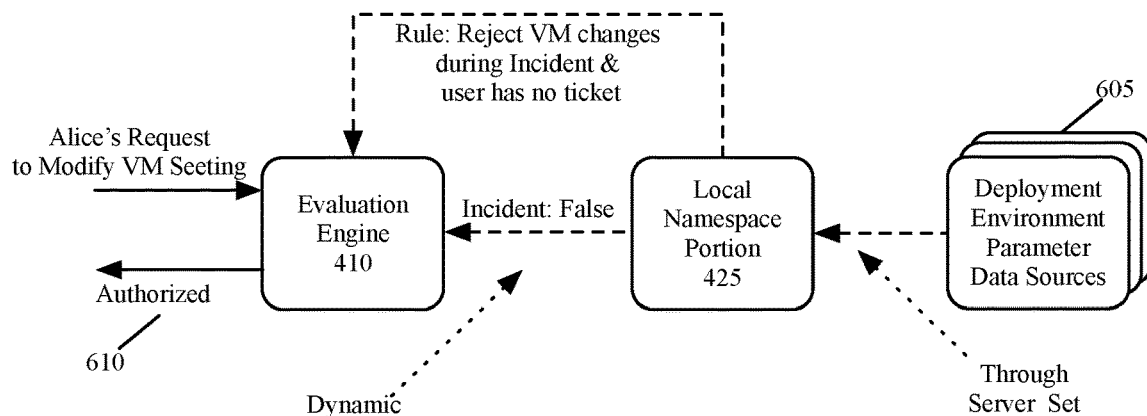
FIGS. 6-8 illustrate three examples of the evaluation engine of a local agent resolving the same API authorization request based on deployment specific policies and operands, with the values of the operands changing dynamically based on network conditions.
Figure 7:
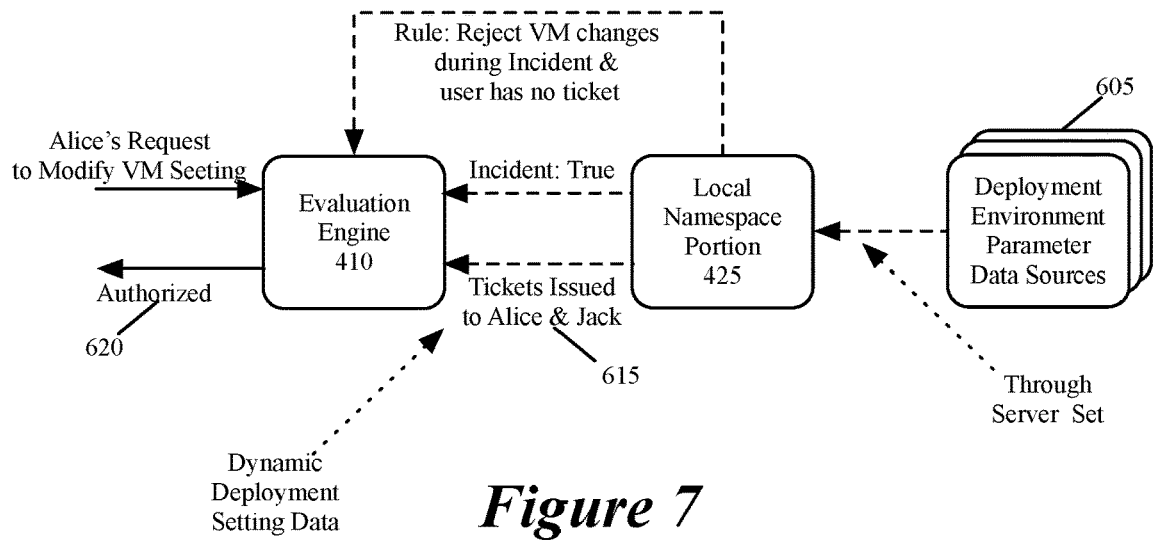
Figure 8:
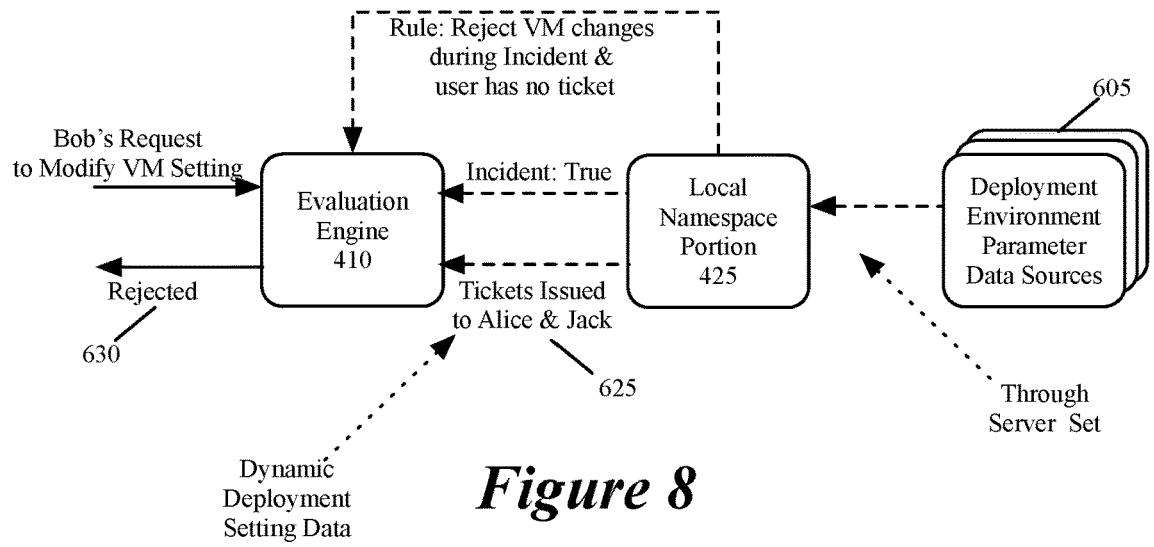

FIGS. 6-8 present three examples that illustrate the evaluation engine 410 of a local agent resolving the same API authorization request based on deployment specific policies and operands, with the values of the operands changing dynamically based on network conditions. In these examples, the same application (not shown) sends three requests to the evaluation engine to authorize an API call associated with changing a setting of a VM. Also, in each of these examples, the evaluation engine processes the same API-authorization policy, which includes one rule that specifies that modifications to the VM settings should be rejected during time periods in which an incident is being reported for the VM's host computer unless the user requesting the setting change has been issued a ticket, such as a user-authentication ticket or a project tracking ticket. In some embodiments, the ticket would be issued by a third-party ticketing application such as the Jira Issue and Project Tracking applications of Atlassian.

In these examples of FIGS. 6-8, the policy being enforced is custom-defined for a deployment of the policy enforcement system 100 of some embodiments. While this deployment restricts VM modifications during incidents, another deployment of the policy enforcement system might not. Other deployments might not even have any VMs; they might only have standalone computers or they might only use containers. Moreover, in these examples, the operands for resolving the specified VM-modification policy dynamically change. Specifically, these operands include (1) the Boolean Incident flag and (2) array that specifies identity of the users with tickets (if any). Both the Boolean parameter and the ticket array can be changed at any time. The Incident flag is false when there is no issue in the VM's host computer, while it is true when there is an issue in the VM's host computer. Also, each time a user obtains a ticket for performing a task, the user's identity is added to the ticket array. The user's identity is removed from the ticket array when the ticket expires. All of these parameters are deployment specific and can change dynamically in real time.

As mentioned above, the agent's local namespace portion 425 in some embodiments is updated (through push or pull operations) whenever policy opcodes and/or policy operands are modified in the copy of the namespace that is maintained by the server set 105. Similarly, the server set's copy of the namespace is updated whenever a new policy is added, modified or deleted, and/or an operand's value changes through the various policy input interfaces and operand import interfaces of the server set.

Accordingly, whenever the Incident flag changes its value or whenever a user is added or removed from the ticket array, the server set's operand import interfaces modify the values of the Incident flag and the ticket array. From this namespace, these changes are propagated to the agent's local namespace portion 425 through push operations or pull operations. The examples illustrated in FIGS. 6-8 provide an abridged view of this propagation by showing data being sent from one or more data sources 605 in the deployment environment to the local namespace portion 425. These figures also do not show the policy and data fetcher 415, the rule compiler 430 and the created runtime rule and parameter structure 435 in order to keep the illustrations in these figures simple. Instead, these figures just show the evaluation engine 410 receiving the VM-modification policy's rule that specifies that VM changes should be rejected during an incident when the requesting user does not have a ticket. These abridged representations are illustrated with dashed arrows in these figures.

FIG. 6 illustrates the case when the VM modification API call is received when there is no incident. Thus, in this example, the evaluation engine sends a reply 610 that indicates that the API call is authorized. FIG. 7 illustrates the case when the VM modification API call is received when there is an incident and the user associated with this API call is Alice. As shown, the ticket array 615 identifies Alice as someone who has been issued a ticket. Accordingly, in this example, the evaluation engine sends a reply 620 that indicates that the API call is authorized. FIG. 8 illustrates the case when the VM modification API call is received when there is an incident but the user associated with this API call is Bob. As shown, the ticket array 625 does not identify Bob as someone who has been issued a ticket. Accordingly, in this example, the evaluation engine sends a reply 630 that indicates that the API call is rejected.

FIG. 9 illustrates an example of the policy opcode and operand that can be used to implement API-authorization controls similar to those of the examples illustrated in FIG. 6-8. Unlike the examples of FIGS. 6-8 that resolve one rule, the policy opcode in the example of FIG. 9 has three rules. To resolve this policy opcode, three sets of parameters 902 are identified in-line within the policy opcode for authorizing API calls regarding VM modifications. These three sets of parameters specify an LDAP group directory, a data store specifying occurrences of incidents, and a JIRA ticketing data source.

A first rule 905 specifies that a VM-modification API call should be allowed if the call comes from a user in the engineering staff during a period in which VM-modifications are not blocked. The second rule 910 defines whether the current time period (i.e., the period during which the VM-modification API call is received) is a time period that the VM-modification call should be blocked. This rule specifies that the current time period is a blocked time period if the Boolean Incident flag is currently true and there is no temporary exemption. The third rule 915 defines whether an exemption should be granted during an incident for the user associated with the received API call. This rule specifies that a temporary exemption should be granted if the ticket array includes the user identity and the issues label for this user in the labels array identifies the ticket to be associated with the existence of an incident.

Based on these rules, the evaluation engine will authorize VM-modification API calls from anyone within the engineering staff (as identified by the LDAP directory) when there is no incident. It will also authorize such calls during an incident from anyone within the engineering staff when the user has a ticket associated with incidents. However, it will reject such calls during an incident from anyone that does not have a ticket associated with the incident.

The above-described local API-authorization request processing of FIGS. 2-9 has several advantages. First, by packing the relevant portion of the namespace with both policies and data parameters for resolving these policies, and then providing this portion to a local agent executing on the same host computer as the applications that need their API calls authorized, this API-authorization request processing is fast and highly available. No remote device has to be accessed to process these requests.

This approach can also cache the optimized rule data structure for the API-authorization policy opcode associated with an API call after this structure is created for assessing whether the API call should be allowed. This cached rule data structure can be subsequently use for processing requests associated with the same API call. In this manner, the cached structure eliminates the need for the rule compiler to recreate the optimized rule structure while the local agent processes the authorization request with the subsequent iterations of the same API call.

As mentioned above, the local API-authorization request processing of some embodiments also caches decision. Whenever decisions are cached, the system has to address cache revocation. Revoking cache decisions when policies are enforced by a central set of servers is complicated. A centralized approach might use rather long caching timeouts to maximize the efficiency of its decision caching. But this would then require some mechanism to explicitly detect which cached decisions have to be revoked when a policy or data changes. Otherwise the local cache could store stale decisions for long periods of time, before they timeout and are replaced with new ones matching the updated policy and data.

To figure out the decisions to revoke from cache, the application in the centralized approach would have to keep track of policies and data used in the decisions it receives from the centralized location—and then the centralized decision maker would have to inform the application if any of these change. This is convoluted at best: to support revocation, the interface between application and centralized decision maker has to deal with policy and data information that they would not otherwise even need. After all, the authorization decisions are executed centrally, outside of the application, yet somehow, applications would have to understand the data and policies used in those decisions so that they could cache those decisions. As a result, the interface between the application and central location would now include information about data, policies and decisions.

On the other hand, in the above-described local API-authorization request processing of FIGS. 2-9, the interface between the application and decision is just about namespace (i.e., about the policies and data). The entire namespace bundle comes with a single version that the application can use to check if the central location has any updates for this portion of the namespace. This results in much simpler and reliable interface between the application and central location.

One of ordinary skill will realize that FIGS. 6-9 only provide some examples that describe the operations of some embodiments of the invention. The API-authorization system of some embodiments can be used to resolve many other API-authorization policies dynamically. Moreover, even the operations described in the examples of FIGS. 6-9 are implemented differently in different embodiments. For instance, instead of relying on an incident flag to determine whether there is an incident associated with a host computer, VM or container on which an API-processing application executes, the evaluation engine 410 dynamically computes this parameter (i.e., dynamically determines whether there is an incident). To dynamically determine this parameter, the evaluation engine 410 in some embodiments could direct the fetcher 415 to iteratively retrieve different policies and/or operands from the namespace as the evaluation engine processes the optimized rule structure 435. The incident parameter could then be the result of one or more of these retrieval and processing operations.

FIG. 10 illustrates the software architecture 1000 of the server set 105 of some embodiments of the invention. Two or more servers in some embodiments can implement the server-side modules 1010 in this architecture. Also, in some embodiments, multiple instances of the same modules execute on different servers in the server set 105 as this server set has two or more servers performing the same operations in these embodiments. As shown, the server set 105 includes local-agent API interface 1025, browser-API interface 1030, policy and content document database 1035, indexed decision logs and agent status data storage 1042, parameter ingesting interface 1040 and policy authoring interface 1045.

The interfaces 1025 and 1030 communicatively connect the server-side modules 1010 to client-side modules 1005. Specifically, the browser interface 1030 processes communications between the server set's modules and the browser clients, while the agent interface 1025 processes communications between the server set modules and the remote local agents 220 on the host computers.

The local agents 220 communicate with server modules 1010 by using APIs of the server's agent interface 1025. This interface includes (1) a download API that provides the functionality to download a bundle of policies and related data and then request its next version, if a new version is available, and (2) an upload API that provides the functionality for the agents to report back any policy decisions they have made. The download API accesses the document database underneath to compile the policies and any of their dependencies (whether they are data or other policies) into a bundle. In some embodiments, the agent interface 1025 provides local namespace portions and updates to these portions in response to queries for the namespaces and updates to the namespaces. The upload API uses a separate decision database to log any decisions clients have reported.

As mentioned above, the policy and content document database 1035 in some embodiments is a custom namespace database. This database can persist both policies and any data the policies need in their evaluation. In some embodiments, the database saves policies as plain source code, while storing the data as JSON documents. The policy and content database 1035 in some embodiments includes a hierarchical namespace for each entity in one or more datacenters for which the server set defines and distributes API-authorization policies. As this database 1035 merges the data and policies into one global hierarchical namespace layout, database clients can access a nested portion of the namespaces simply by requesting policy operands by their fully qualified names.

The server set copy of the policy and content database 1035 in some embodiments can save all versions of the data and policies over time for an entity. When either a data or policy is updated, its previous version is not removed but archived in some embodiments. This allows time traversal: the server set can inspect the state of policies and their related data at any point in time by simply defining the time of interest when accessing the namespace. Time traversal is useful for troubleshooting (to understand exactly what the state of the policies was at the time of an issue) and for auditing (to convince oneself the system state was correct throughout the audited period of time). Also, in some embodiments, the policy and content database 1035 implements delta-encoding to avoid saving entire copies of all data and policies after each, potentially small, change. This is very effective as most of the data is rather stable with only a steady stream of fairly local changes over time.

As mentioned above, policies refer and use deployment-specific parameters describing the current state of the managed resources and datacenter. To retrieve and properly format the parameters for consumption, the server set uses the parameter ingesting interface 1040 in some embodiments. The parameter ingesting interface 1040 includes one or more data source adapters, each capable of using a remote management API of a parameter data source to collect deployment specific parameters (e.g., through data crawl operations) and transforming the collected parameter data from its native format into a structured document (e.g., a JSON document) for storing in the database 1035. For instance, when the API authorization system validates API requests to micro service applications deployed in Amazon Web Services (AWS) cloud infrastructure, the parameter ingestion interface 1035 has one or more data source adapters to collect data needed for processing different AWS APIs.

In case a relevant data is easily accessible from a database, the parameter-ingesting interface 1040 includes a data source adapter that can implement the relevant database access protocol and directly replicate the relevant portion of the remote database. For instance, in some embodiments, a data source adapter is used to retrieve user group information from a remote user directory by using LDAP protocols.

The policy-authoring interface 1045 in some embodiments provides resources that allow the server set to generate policies for an entity. In some embodiments, this interface is accessible through bowser clients 1020 and the browser interface 1030. Policies in some embodiments can also be uploaded to the server set through an API interface.

In some embodiments, the decision and status storage 1042 is a database that stores the received decision log entries for archiving. An indexing engine (not shown) builds a text search index over the stored decision log entries. The index is useful for the UI component as it enables running queries about the decisions, e.g., during troubleshooting when a particular application is not operating as expected and the related policy decisions need to be further inspected. The browser clients 1020 in some embodiments are JavaScript applications. Through the browser API interface 1030, the browser clients 1020 can access the underlying databases/indices. This allows the browser clients 1020 to access any current or past policy/parameter state, as well as allow inspection of the policy decisions done.

The policy defining and distribution system of FIG. 10 has several advantages. It imports remote management API state (e.g., as JSON objects) in the document database, which allows the system to effectively construct a logical, centralized view of the datacenter state. This combined with versioning allows the system to provide versioned snapshots of the entire datacenter state, if needed. For example, in some embodiments, the local agents identify the namespace versions that they use to process the API-authorization requests and provide this version information to the server set to store in the decision logs 1042. Subsequently, through the browser interface 1030 and the decision logs 1042, a user can perform browser-based searches to extract the exact state of the policies and parameters at the time a decision was made. This state information includes the version data. The version data can also be used to search the decision logs. These capabilities are highly useful for debugging the API-authorization system. These search and debug operations are also supported in some embodiments through API interfaces that support API calls from automated processes that collect and process log data.

Also, the system's overall process of extracting remote management APIs, disseminates relevant pieces of this data together with the relevant policy code for the agents. This near real time dissemination of management state is highly beneficial, which current techniques cannot duplicate. Current systems integrate with the necessary remote management APIs on their own, which creates N2 integrations, whereas the system 100 can do the integrations once, which results in N integrations.

The system 100 also uses a declarative policy language for document-oriented, structured data. Also, as mentioned above, the system 100 in some embodiments decouples policy (authorization) logic from the applications to an agent nearby. In a traditional authorization solution (e.g., using LDAP), the policy logic is part of the application source code and application directly retrieves the relevant data from the LDAP, applying its logic on the data retrieved.

As discussed above, some embodiments of the invention provide a local agent 120 to enforce API authorization policies for software systems such as applications 115. In some embodiments, these local agents are associated with one more applications running on a host computer 110. In some embodiments, the local agents are inside virtual machines or containers that execute on the host computer. The local agents retrieve or receive at least a portion of a runtime storage namespace containing policies and parameters (e.g., opcodes and operands, respectively) from various sources in some embodiments, including the central server set 105 and the data sources 132. The local agents evaluate the policies using the parameters in order to make authorization decisions for API-authorization requests from the applications. Communication between the local agents and the applications is handled in some embodiments through RPC (Remote Procedure Call), or other mechanisms such as IPC (inter-process communication) that initiate above the network stack. Each local policy agent is in some embodiments a local policy engine that operates as a "side-car" to the associated application or software system.

Executing a policy engine in a system side-car is a practical compromise in some embodiments that provides fate-sharing with the application and minimal local-host network communications cost. However, performance is still non-ideal with such side-cars, since each interaction with the policy engine involves communication (e.g., RPC), which involves marshaling and un-marshaling the policy evaluation calls. Similarly, crossing the process boundaries comes with increased latency cost, compared to a process-internal function call. Moreover, operational requirements may complicate deployment of side-cars: it is not uncommon to have strict limitations on additional processes deployed with the primary application processes. Reducing the programming language and system execution environment-specific code is required to tackle the implementation and maintenance cost of embedding policy execution into applications or other software systems (e.g. healthcare, banking, and industrial environments).

In some embodiments of the invention, the policy engine is embedded directly into the application itself, by using an abstract policy execution virtual machine (or, "policy VM") that has its own instruction set. The policy VM instruction set may in some embodiments be entirely custom and thus require a custom virtual machine. In other embodiments, it is possible to leverage pre-existing, general purpose virtual machine implementations, as long as they provide sufficient expressivity and provide the ability to integrate with the desired programming languages and their execution environments. For example, virtual machine instruction sets such as WebAssembly (WASM) and Lua meet these requirements. Less general-purpose instruction sets are also an option in some embodiments, but may require limiting the policies that are to be compiled and supported. One example of such a more limited, less general instruction set is extended Berkeley Packet Filter (eBPF), used in the Linux kernel.

A policy VM is a type of virtual machine that should not be confused with full-fledged system virtual machines (or, "system VMs") that virtualize the hardware of a computer system, as provided by vendors such as Microsoft or VMWare. Instead, the policy VM is a process virtual machine (referred to as a "process VM" to distinguish from system VMs) that virtualizes the execution environment of a single query or program, analogous to SQL or Java. Effectively, process VMs provide a sandbox runtime interpreter or environment, which can be embedded into an application.

Figure 11:
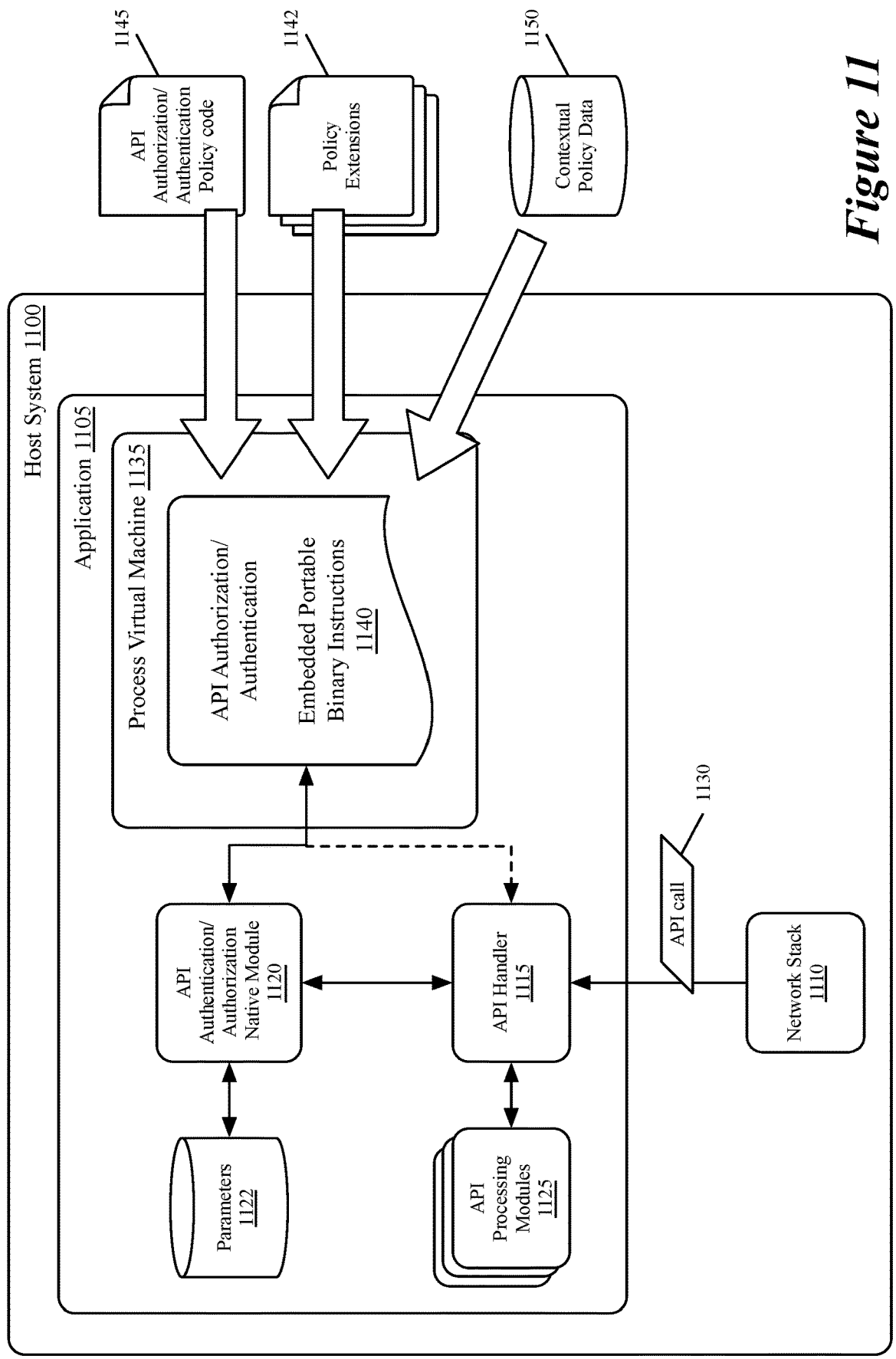
FIG. 11 conceptually illustrates an application architecture with an embedded process VM of some embodiments.

FIG. 11 conceptually illustrates an application architecture with an embedded process virtual machine of some embodiments. Specifically, it illustrates a host system 1100 (e.g., a host computer, a system virtual machine or container, etc.) on which at least one application or software system 1105 executes. The host system also has a network stack 1110 (e.g., TCP/IP stack) that implements a network communication protocol suite to allow at least one application 1105 and other processes of the system 1100 to communicate with each other, and communicate with applications and processes executing outside of the system 1100 (e.g., on other computers or devices, not shown).

As shown in FIG. 11, the application 1105 has an API handler 1115, a native API-authentication and authorization module 1120, and one or more API processing modules 1125. In some embodiments, the API-authentication and authorization module is implemented as separate modules for authentication and authorization, analogous to the modules 228 and 230 described above in reference to FIG. 2. Each API processing module 1125 is a module (e.g., an object) that performs an operation based on an API call to it. The API handler 1115 is the module that initiates the authentication operation and authorization operation for each API call. The native authentication and authorization module 1120 evaluates the policy (e.g., the policy opcode), using parameters 1122 (e.g., the policy operands). After receiving authorization for an API call from the native authentication/authorization module 1120, the API handler 1115 passes the API call request to the appropriate module 1125 to execute the requested API.

In some embodiments described more fully above with reference to FIG. 3, the application 1105 performs the process 300 when it receives an API call 1130 (e.g., via the network stack 1110) requiring authorization. In these embodiments, the native module 1120 sends at 325 an authorization request (e.g., using an RPC message) via the network stack 1110 to a local API-authorizing agent 220 running outside the application (not shown in FIG. 11). In such embodiments, some of the parameters 1122 used to evaluate the policy may be supplied from external sources such as the local namespace portion 225 or the local parameter integrator 255.

However, in other embodiments, the application 1105 also contains a process virtual machine (VM) 1135 that is embedded within the application and supports an instruction set that is not native to the application (e.g., an instruction set native to the underlying processor of the host system 1100 that executes the application). In these embodiments, the application 1105 performs process 300 when it receives an API call 1130 as before, but the native module 1120 sends at 325 the authorization request to the process VM 1135 running inside the application, instead of the local API-authorizing agent 220 running outside the application. Since the process VM 1135 is embedded inside the application 1105, the request does not need to be routed through the network stack 1110, but can instead be directly communicated from the native module 1120 to the process VM 1135. In some embodiments, the request can even bypass the native module 1120 entirely, and is sent directly to the process VM 1135 from the API handler 1115 (as indicated by the dashed line). The process VM 1135 makes the authorization decision (at 330) for the API call 1130.

In order for the process VM to make the authorization decision, in some embodiments it must execute a set of instructions to evaluate the applicable policies for the application 1105. In some embodiments, the instruction set is implemented as a set of binary instructions 1140 embedded within and executed by the process VM 1135. These binary instructions are said to be in a "portable" binary format because even though they are intended to be low-level code analogous to machine language, they are platform and processor agnostic and can be interpreted or compiled into native code on any supporting system. For accurate authorization decisions, the applicable policy must be expressed in terms of the portable binary instruction set supported by the process VM.

In some embodiments, the source policy (or policies) and associated parameters 1122 are retrieved/received from the namespace and translated (e.g., compiled) into portable binary instructions 1140 that can be executed by the process VM 1135 inside the application 1105. The source policies in some embodiments are expressed in a policy language code 1145, e.g. Rego, that can be compiled into the portable binary instructions 1140 executable by the process VM 1135. In some embodiments, the compilation of the portable binary instructions (and incorporation of the extensions or plugins) from the policy language code is offline (e.g., compiled at the policy server set 105), and the compiled binary instructions are distributed to the applications or host systems.

In addition, policy plugins or extensions 1142 may also be incorporated into the portable binary instructions 1140. These plugins or extensions may be expressed in a different language than the policy language in some embodiments. In some embodiments, these plugins and extensions may be implemented in the same language or format that is native to the process VM 1135.

Figure 12:
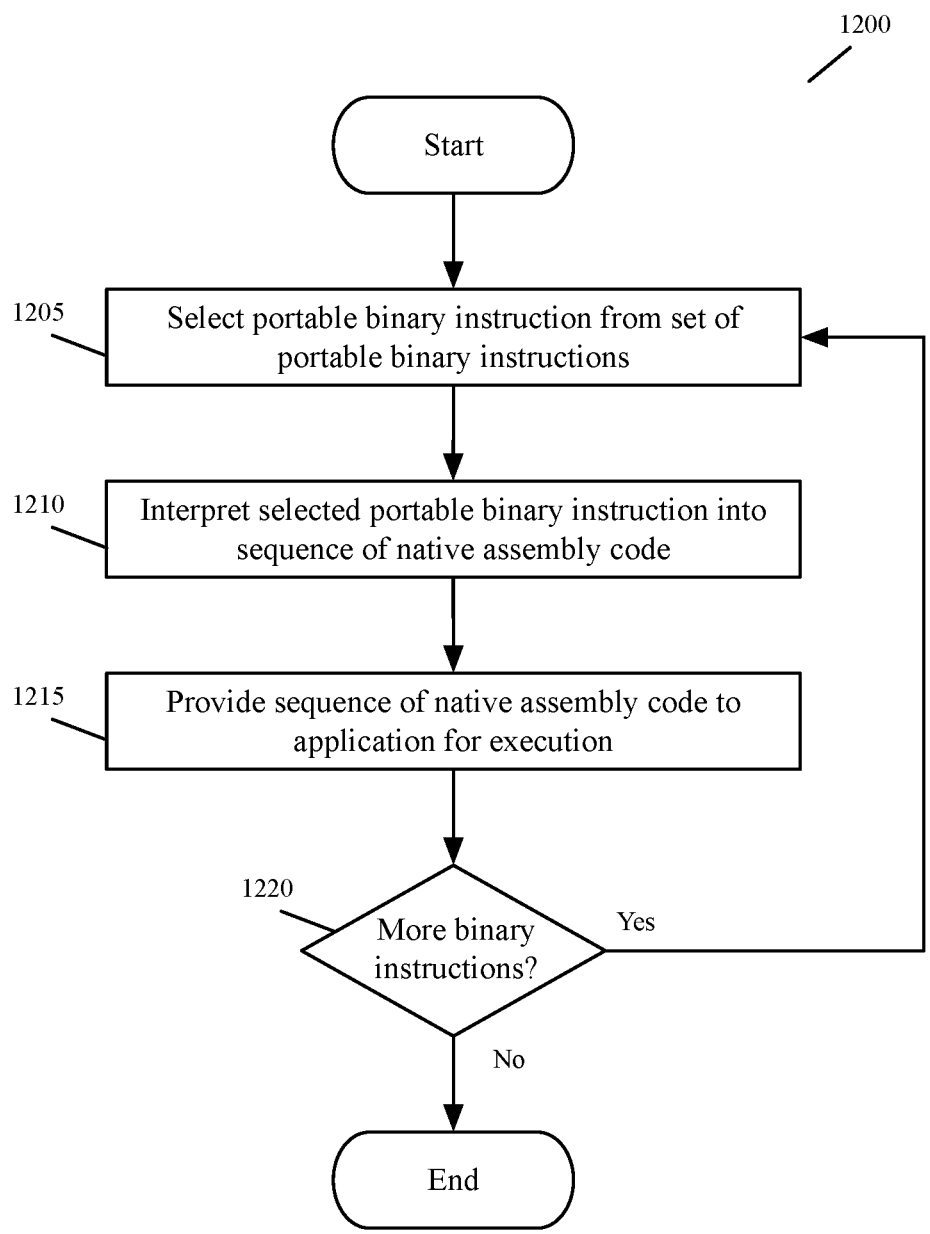
FIG. 12 conceptually illustrates a process performed by the process VM to evaluate the policy for an API-authorization request by sequentially interpreting a set of binary instructions.

In some embodiments, the process VM 1135 executes the portable binary instructions 1140 to evaluate the policy by performing process 1200 in FIG. 12. The process 1200 begins by selecting at 1205 the first portable binary instruction. Some examples of these instructions are an instruction to access data from a location in memory, an instruction to perform an operation on data, an instruction to evaluate a conditional statement, and an instruction to jump to another instruction. These instructions are in a format native to the process VM 1135 and non-native to the application 1105 (e.g., Web Assembly, Lua, eBPF, etc.).

The process 1200 interprets at 1210 the selected portable binary instruction into a sequence of native assembly code (or machine language). This assembly code is native to the application in some embodiments, or in other embodiments native to the underlying processor that executes the application. In some embodiments, the assembly code is a fixed set of lower level instructions, so that a sequence of assembly code is not dynamically representative of the selected instruction. Instead, different portions (or blocks, or "blobs") of the fixed set are executed in different orders, depending on which instructions have been selected.

After interpretation, the resulting sequence of assembly code is provided at 1215 to the application 1105 for execution. The computational cost of execution is not the execution time of the sequence of code, but arises in some embodiments from chaining different sequences of assembly code together, jumping from one to another, passing information from one to the other, etc. The application executes the sequence of assembly code at native speed, but there is a delay in some embodiments that is imposed by chaining each interpreted sequence together.

After executing the interpreted native instruction, the process 1200 determines at 1220 if there are additional portable binary instructions. The next instruction may simply be the next instruction, sequentially. Alternatively, the next instruction may be an instruction elsewhere in the set which was referenced by the previous instruction. If there are additional portable binary instructions to execute, the process 1200 returns to 1205, which was described above. If there are no additional instructions to execute, the process 1200 ends.

In the above embodiment, the interpretation operation 1210 occurs prior to the execution operation. However, in other embodiments, the interpretation operation covers both operations, namely the translation to the executable blocks (each typically representing a single binary instruction being translated) and the execution of the blocks. In some embodiments, the translation may occur lazily, e.g. one instruction at a time, or in other embodiments it may occur proactively, as an initialization step.

The process 1200 described in FIG. 12 is an example of an interpreter approach to evaluating the policy of some embodiments, by interpreting each portable binary instruction one at a time. One disadvantage of this approach in some embodiments is that it is slow, since each instruction must be separately analyzed and interpreted. Another disadvantage in some embodiments is that optimizations for native execution cannot be performed on the resulting assembly code. These drawbacks can be ameliorated by compiling the entire set of portable binary instructions to native format instead of interpreting them one by one, as discussed in further detail below with reference to FIG. 13.

Figure 13:
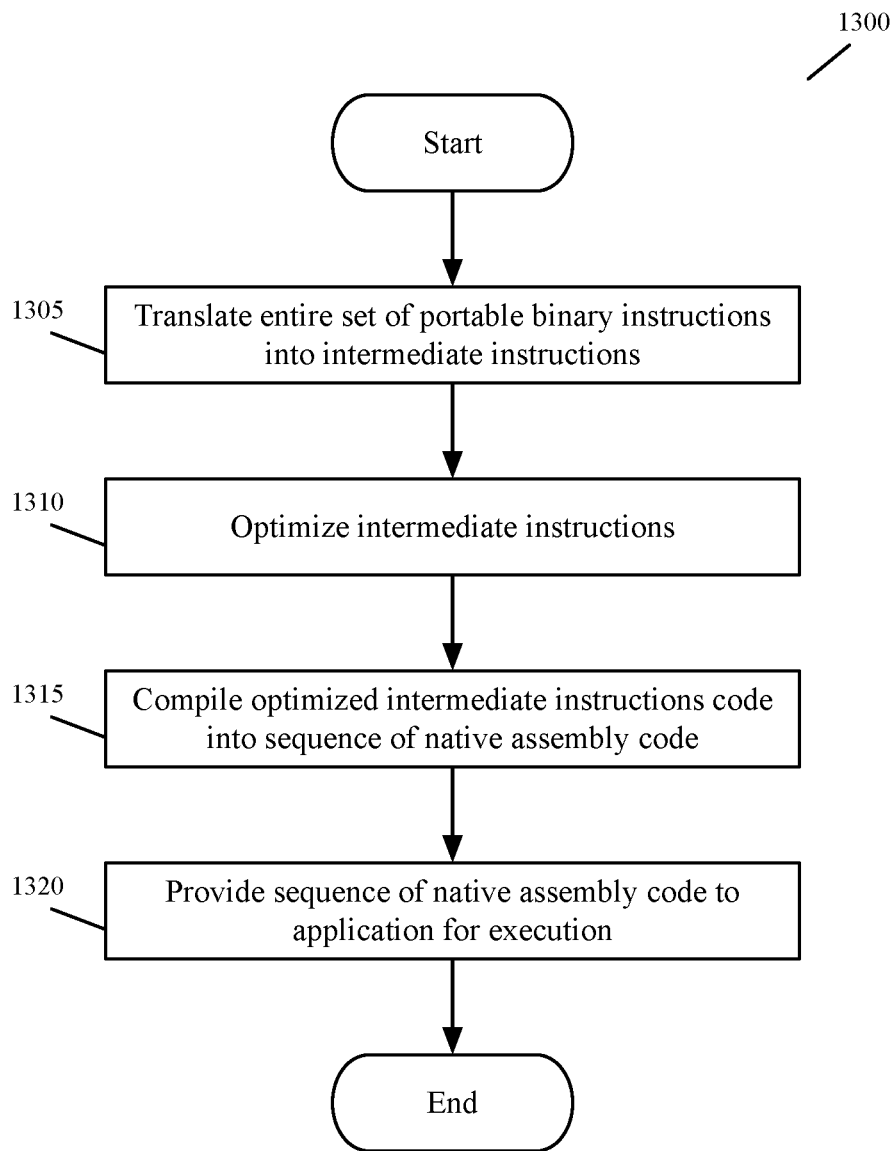
FIG. 13 conceptually illustrates a process performed by the process VM to evaluate the policy for an API-authorization request by compiling a set of binary instructions.

In some embodiments, the process VM 1135 executes the portable binary instructions 1140 to evaluate the policy by performing process 1300 in FIG. 13. The process 1200 begins in some embodiments by translating at 1305 the entire set of portable binary instructions at once, into an intermediate set of instructions. These instructions are an intermediate representation of the policy, expressed at a level of abstraction in between the high level (e.g., human-readable) expression in the policy language (e.g., Rego) and the low-level (e.g., machine language) native assembly code.

The intermediate set of instructions are optimized at 1310 for the application (or the underlying processor). This type of optimization process is not possible on the portable binary set of instructions, since the optimizations must be specific to the application or processor.

Further, the optimizations are very difficult to implement at the level of assembly code, given the limited and fixed set of available instructions at that low level. The optimizations at higher levels of abstraction are progressively easier to implement. In some embodiments, there are several varying levels of abstract language produced with different optimizations performed on each intermediate compilation product. Each input level is therefore lower in abstraction than the output, progressively compiling towards the final assembly code.

The optimized code is compiled at 1315 into a sequence of native assembly code. This assembly code is the same in some embodiments as that referred to above with reference to FIG. 12, which can be executed natively by the application or the processor. Unlike the analogous operation 1210 in process 1200, the compilation is not from the portable binary instruction set to the assembly code, but from the optimized, intermediate instruction set to the assembly code.

The above operations of process 1300 must be performed in some embodiments by a "smart" compiler that is able to perform both the optimization and the compilation operations. However, in other embodiments, where the process 1300 is performed by a relatively "simple" compiler that cannot perform such optimizations, the process 1300 jumps directly from operation 1305 to operation 1320, bypassing the optimization steps in between. However, even absent optimization, in some embodiments there is still a substantial performance advantage relative to the interpretation process 1200.

The sequence of native assembly code is provided at 1320 to the application 1105 for execution. Unlike the interpretation case discussed above with reference to FIG. 12, there is no delay imposed by jumping back and forth, dispatching, stitching, etc. since the entire set of portable binary instructions was translated at once. As a result the output assembly code is one seamless instruction set that can be executed at native speed. The process 1300 then ends.

As described above, the process VM 1135 executes (by compiling or interpreting) the portable binary instructions 1140 to evaluate the applicable policy for the API call. Accordingly, a process VM used to evaluate policy can also be referred to as a policy VM. In some embodiments, the policy VM 1135 also uses contextual policy data 1150 to evaluate the policy. The difference between the contextual data 1150 and the parameters 1122 in some embodiments is that the parameters are provided via the API caller, whereas the contextual data is provided by the system 100.

Another difference between contextual data 1150 and parameters 1122 in some embodiments is that parameters are operands that are known to the native API authentication and authorization module 1120 that is the default decision maker for the application 1105. Contextual data 1150 in such embodiments are operands that are not necessarily recognized by the native module, which in may be using a proprietary policy language.

This contextual data is consumed by the policy VM to provide richer policy decisions in some embodiments than is feasible with only the native policy supported by the application 1105, e.g. if the native module 1120 were to make the authorization decision for an API call 1130 itself, relying only on local parameters 1122 such as those provided with the API call or authorization request, from the local namespace portion 425, or from the local parameter integrator 255.

As an example, internal policy may only support access to APIs on the basis of user groups, e.g. admins and regular users. However, contextual data may specify that no admin users may access the system from a foreign location, for additional security. Accordingly, the contextual data of a user's location can be used to modify the user's group membership temporarily while that user is in the foreign country. Likewise, a standard user may have access to an API during regular business hours only. The contextual data could modify their group membership during off-hours so that all access is constrained to the desired period of time. The native policies supported by the native module 1120 and the policy parameters (e.g., group memberships) 1122 may not have any awareness of geographic location or time of day when making an authorization decision. However, the binary process 1140 can incorporate the contextual data 1150, at either compile time or requested/retrieved at run time, to provide more granular policy decisions.

As discussed above, the policy server set 105 in some embodiments stores policy for authorizing each API call as one or more lines of opcode (e.g., as one or more opcode expressions/statements) in a runtime storage structure (e.g., the namespace). Contextual data 1150 is also stored in the namespace in some embodiments, as additional policy operands that are consumed by the policy opcode during evaluation. In some embodiments, the contextual data is in JavaScript Object Notation (JSON) format.

As with other types of policy operands, in some embodiments contextual data 1150 can also accompany the API calls 1130, or the API-authorization requests that are generated in response to such API calls. In some embodiments the contextual data 1150 can also be retrospectively generated by the system, for example based on service usage logs, or in some embodiments prospectively generated based on analysis of the underlying policies. In some embodiments, the contextual data 1150 is used at run time during policy evaluation by executing the portable binary instructions 1140, and in some embodiments some contextual data may also be compiled with the policy code 1145 and incorporated directly into the portable binary instructions 1140.

Figure 14:
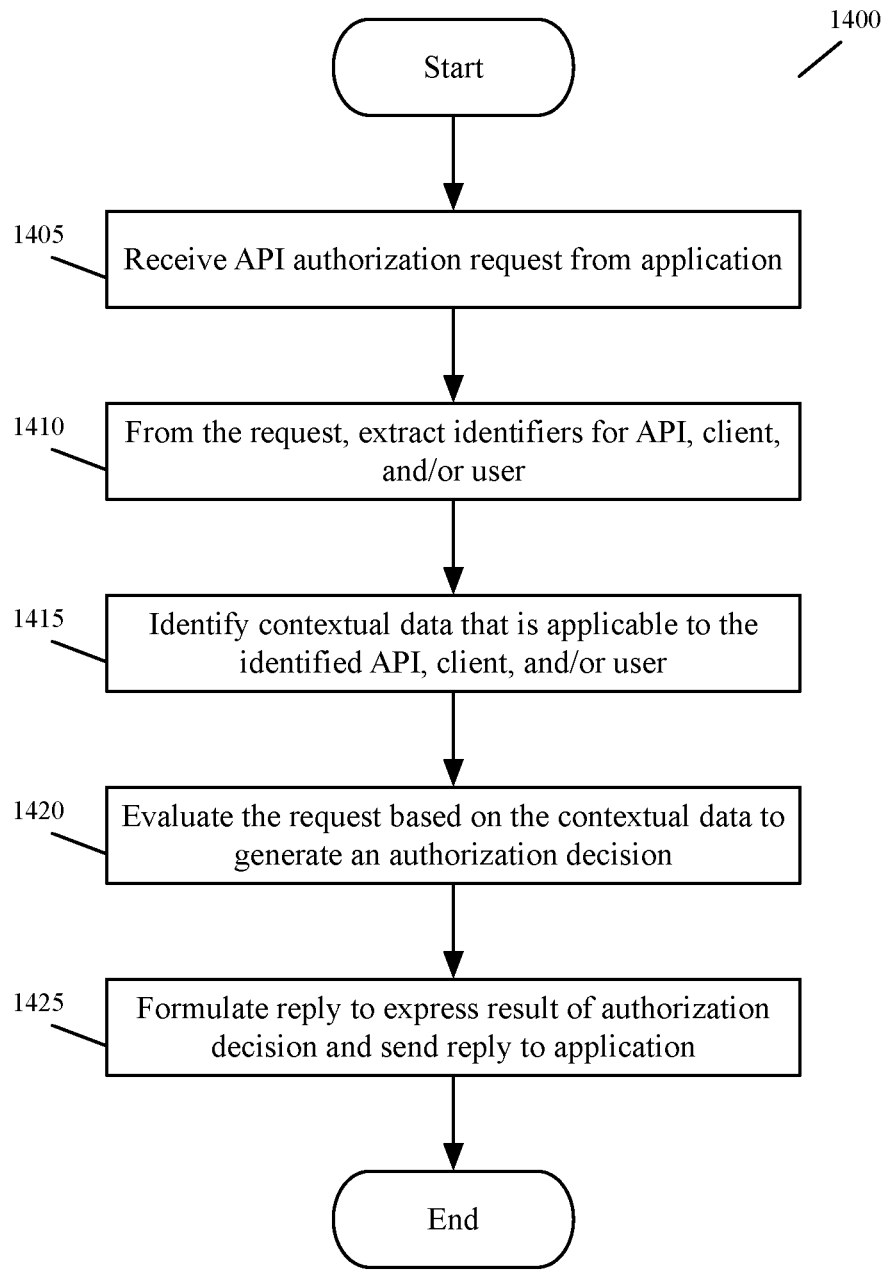
FIG. 14 conceptually illustrates a process performed by the process VM to evaluate the policy for an API-authorization request using contextual data.

In some embodiments, the policy VM 1135 evaluates the policy using contextual data 1150 by performing process 1400 in FIG. 14. The process 1400 begins by receiving an API authorization request from the application 1105. The request in some embodiments contains an API identifier, that is necessary to identify the API since the policy VM may support multiple APIs for the application. The request may include some embodiments a client identifier for the client making the request, and may include in some embodiments a user identifier for a user associated with the application. The process 1400 extracts at 1410 these identifiers.

The process 1400 uses the extracted identifiers to identify at 1415 contextual data 1150 that is applicable to the identified API, client, and/or user. In some embodiments, the process 1400 requests the contextual data from the namespace, located outside the application 1105. In other embodiments, the process 1400 has access to contextual data within the policy VM environment, e.g. compiled into the portable binary instructions.

The identifiers may also be generated in some embodiments from static analysis of the policies, to determine what operands are actually needed for the evaluation. In some such embodiments the policy itself may be modified by this static analysis. For example, the policy would be modified to exclude references to unnecessary contextual data 1150 and/or parameters 1122 that are unused or redundant during evaluation, but would otherwise be passed by default across the boundary between the policy VM and the application. Optimizations for passing information across the boundary will be described in further detail below with reference to FIG. 15.

The process 1400 evaluates the policy at 1420 by executing the portable binary instructions 1140 (e.g., the policy opcode), using the parameters 1122 (e.g., policy operands) and the contextual data 1150 as input (e.g., additional policy operands). In some embodiments, the process 1400 evaluates the policy by interpreting the binary instructions, performing process 1200. In other embodiments, the process 1400 evaluates the policy by compiling the binary instructions, performing process 1300. Evaluation of the policy results in an authorization decision to allow or deny the API authorization request.

The process formulates a reply at 1425 to the API authorization request that includes the authorization decision, and sends the reply back to the application. In some embodiments, the reply is sent back to the native module 1120, whereas in other embodiments the reply is sent back to the API handler 1115, depending on which component initiated the API authorization request. The process 1400 then ends.

While the implementation of the policy VM 1135 is still specific to the programming language and environment, the instruction set is limited enough in some embodiments to keep the policy VM implementation considerably simpler than an entire policy evaluation engine (such as the local policy agent 120). In some embodiments, the instruction set is sufficiently expressive for implementing the policy execution, but not the parsing, compilation, or optimization of the policies. These functions can remain outside of the policy VM 1135 in such embodiments, to be executed by the application 1105 as a part of its bootstrapping procedures.

In some embodiments, the policy evaluation may be split into two or more parts. For example, in some embodiments there is a compiler-implemented pre-evaluation that evaluates the majority of the policy (in some embodiments, by also using the contextual data 1150), leaving the absolute minimum policy for evaluation by the policy VM 1135. In some embodiments the pre-evaluation is also referred to as partial evaluation, whose evaluation output is another policy rather than a policy decision. Partial evaluation is described in more detail in U.S. patent application Ser. No. 16/293,503, which is incorporated herein by reference.

In some embodiments, execution costs are dominated by the secondary costs involving setting up the policy VM 1135 with policies and any data necessary for their execution. Therefore, in such embodiments, the optimality of the short lived policy executions themselves is less critical. Hence, the instruction execution often does not need to be perfectly optimized.

In some embodiments, the instruction set can be custom tailored for policy execution. It is also easier in such embodiments to keep the instruction set stable, even as the policy language evolves. This translates to more stable programming language-specific and environment-specific code.

Providing strong memory and CPU limits is challenging with general purpose programming languages. CPU limits may require custom scheduling implementation, and memory limits require implementing custom memory management. Therefore, implementing limits for each programming language and execution environment is a major cost. Executing the policies within a policy VM 1135 in some embodiments makes providing these limits straightforward. In such embodiments the policy VM can limit the number of virtual instructions executed per policy as well as to limit the maximum memory allocated per policy. Memory isolation can also be readily implemented in some embodiments with policy VMs, reducing the amount of security critical code from the full evaluation engine to the policy VM implementation.

Compiling the policy code 1145 into an abstract instruction set 1140 does not translate the policy language extensions 1142. It is common in some embodiments to have a range of built-in plugins, that can be included into the policy language evaluation runtime. One plugin example is a time and date function, that requires access to a real-time clock implemented at the level of the host system 1100 or an entirely external source (such as NIST). Another example is a cryptographic function (e.g., signing with a private key), that requires computation that cannot be expressed in the policy language, but can be expressed as a stateless function in a more powerful language with necessary mathematical support.

These built-ins act as plugins that can be implemented in some embodiments using traditional programming languages, extending the expressivity and capabilities of the policy language without changing the language specification itself. In some embodiments, these plugins still have to be provided as extensions and incorporated into the policy VM, and they have to be implemented in some embodiments in multiple languages, for multiple execution environments, just like the policy VM 1135 itself. FIG. 11 also illustrates a set of these extensions 1142 being included alongside the policy code 1145, and incorporated into the portable binary instructions 1140.

Executing the policy within a policy VM 1135 effectively isolates it in some embodiments from the rest of the application execution environment. Even though the policy VM runs as a consequence of a function call, within the same process, passing information in and out to/from it requires more effort. This is in addition to the bootstrapping of the policy VM itself, which in some embodiments may require initialization of data structures and memory areas that incur non-trivial cost.

This information passing shares similarities with the cost of RPC. The parameters for the policy execution as well as the return values returned may in some embodiments have to be marshalled and un-marshalled as they cross the boundary between the policy VM and the remaining (application) process. In some embodiments this is because the policy VM instructions and the application execution environment are unlikely to share a common representation for the data types. While still more effective than communicating over the network, the cost remains higher than as a local function where information requires no translation between the caller and callee. Several mechanisms, or their combinations, can be used in some embodiments to alleviate the cost of the boundary. Each of these mechanisms is described in more detail below.

First, information passed across the boundary can be minimized in some embodiments, for example by writing policies to accept and return minimal information, or by statically analyzing the policies and thus identifying the information (e.g., policy operands, such as the parameters 1122 or contextual data 1150) they actually need. This exploits the high level semantics of the policy (or extension) language to optimize the boundary crossing. In some such embodiments, this allows removing the majority of the information that is passed in. In particular, if in some embodiments the information to be passed in is structured (e.g. JSON), policies may only refer to certain fields within the document, and the rest of the fields can be filtered out before transmitting over the boundary.

Figure 15:
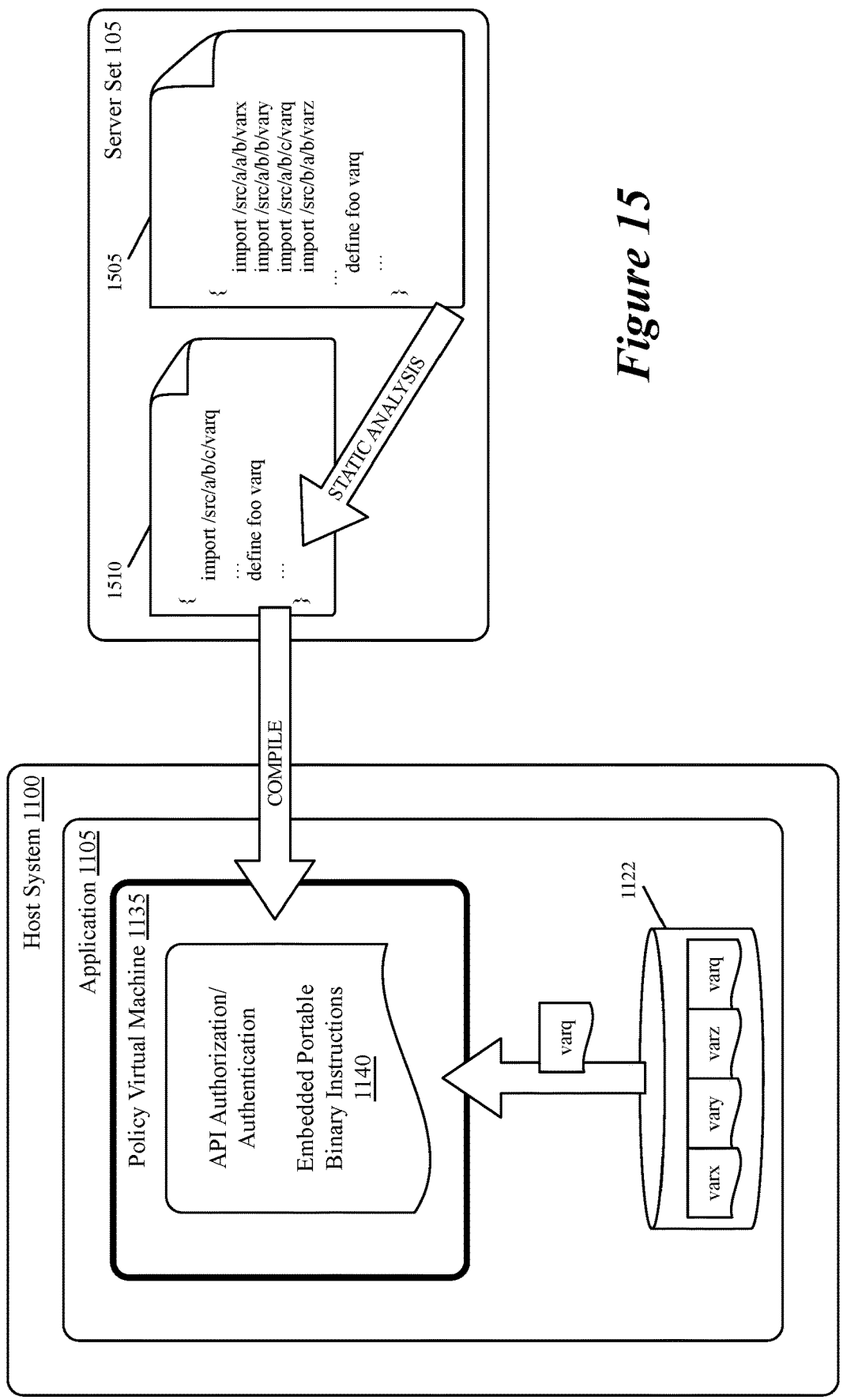
FIG. 15 conceptually illustrates an example of minimizing information passed across the policy VM boundary.

FIG. 15 conceptually illustrates an example of minimizing information passed across the policy VM boundary. At the server set 105, the source policy 1505 written in Rego imports several different fields from a JSON document, from namespace paths/src/a/and/src/b/. These are paths to parameters varx, vary, varz, and varq. However, the actual policy only uses parameter varq, located at/src/a/b/c/.

After performing a static analysis on the source policy 1505, the namespace paths that are not referenced are identified and removed, resulting in a modified policy 1510. This modified policy 1510 is compiled into the portable binary instructions 1140 that are executed by the policy VM 1135, rather than the original policy 1505.

During policy evaluation, only parameter varq is passed from parameter storage 1122 across the policy VM 1135 boundary (rendered in a thicker border for emphasis), since the modified policy no longer references the unused parameters. The other parameters varx, vary, and varz are therefore no longer marshaled for transfer across the boundary, saving substantial resources.

The example above described parameters 1122 being passed across the boundary between the application 1105 and the policy VM 1135. However, the optimization also applies in some embodiments to contextual data 1150. References to any policy operand that is not necessary for evaluation of the policy can be removed from the source opcode during the optimization process, to minimize all information being passed across that boundary.

In addition to reducing the information passed across the boundary, there are several other methods to alleviate the cost of the boundary. As a second example, policy VMs can be recycled in some embodiments, instead of constructing them from scratch for each policy evaluation.

As a third example, in some embodiments, information may be represented in binary formats that are understood by both sides, i.e. the application 1105 hosting the policy VM 1135 and the policy VM instructions 1140. This way the data requires no serialization and deserialization as it crosses the boundary. The information passing cost in such embodiments becomes the cost of copying the data over. As a related fourth example, shared binary formats open the door in some embodiments for shared memory-based zero-copy information passing.

As a fifth example, information passing may in some embodiments be more fine-grained, or "lazy," in that information is only shared and transmitted across the boundary if it is requested by the evaluation or the application code inspecting the result of the evaluation.

Figure 16:
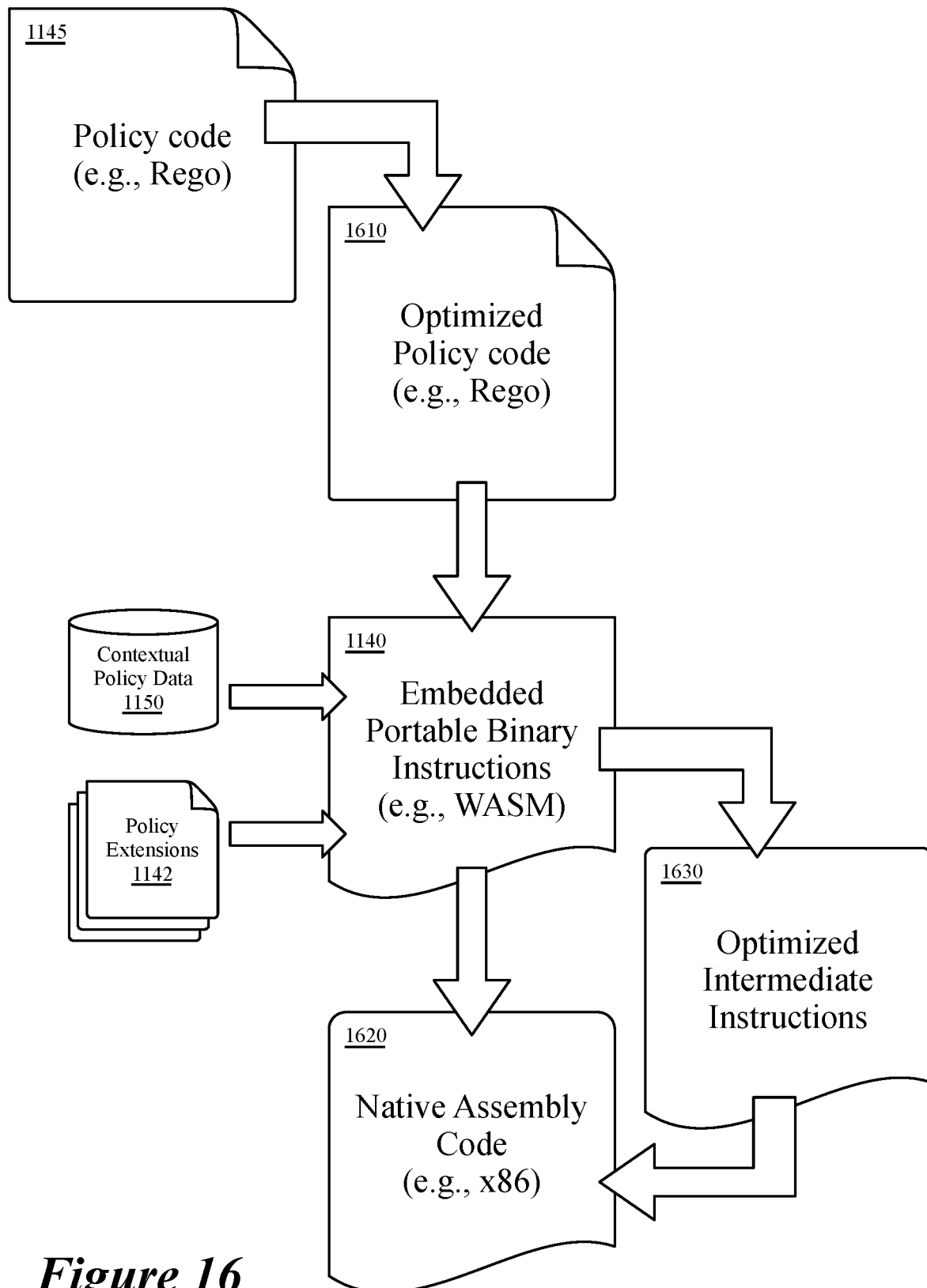
FIG. 16 conceptually illustrates the different stages of the policy code as it is compiled towards the final assembly code product.

FIG. 16 conceptually illustrates an example of different stages of the policy code as it is compiled towards the final assembly code product for execution. The source policy opcode 1145 is defined in a high-level policy language such as Rego, that is authored by the user (e.g., using the policy authoring interface 1045).

Based on a static analysis, the source policy opcode 1145 is optimized by removing references to unused or redundant parameters, in order to minimize the information passing across the policy VM boundary during policy evaluation. The output of the optimization is another policy opcode 1610, expressed in the same policy language as the source policy opcode 1145. In some embodiments, the optimization is performed by a policy optimizer that runs on the server set 105 (e.g., offline, when there is no user waiting for a response).

The optimized policy opcode 1610 is compiled into the embedded set of portable binary instructions 1140, expressed in some embodiments in a language such as WebAssembly (WASM), Lua, or eBPF that corresponds to the policy VM 1135 embedded within the application 1105. In some embodiments, the compiling is performed by a policy compiler that runs on the server set 105. In addition, contextual policy data 1150 and policy extensions 1142 are also incorporated into the portable binary instructions.

In some embodiments, when an API authorization request is received, the binary instructions 1140 are interpreted (as described above in reference to FIG. 12) or compiled (as described above in reference to FIG. 13) directly into native assembly code 1620 for execution. The native assembly code is an x86 instruction set or another processor-specific instruction set in some embodiments. In some embodiments, the native assembly code is generated by an interpreter or a "simple" compiler that runs within the policy VM 1135, or in some embodiments in the application 1105 outside the policy VM 1135, e.g. as a side-car to the policy VM.

In other embodiments, the binary instructions 1140 are compiled (as described above in FIG. 13) to an intermediate set of instructions 1630. These are a lower level of abstraction than the policy code but a higher level of abstraction than the native assembly code. During this compile operation, the application native set of instructions are also optimized in some embodiments for execution on the underlying processor. In some embodiments, the intermediate instructions are compiled and optimized by a "smart" compiler that runs within the policy VM 1135.

The optimized intermediate instructions are compiled into the native assembly code 1620. In some embodiments, this compiling operation is performed by the same "smart" compiler running within the policy VM 1135. In other embodiments, this compiling operation is performed by a different compiler, that runs inside the policy VM 1135, or in some embodiments in the application 1105 outside the policy VM 1135, e.g. as a side-car to the policy VM.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 17:
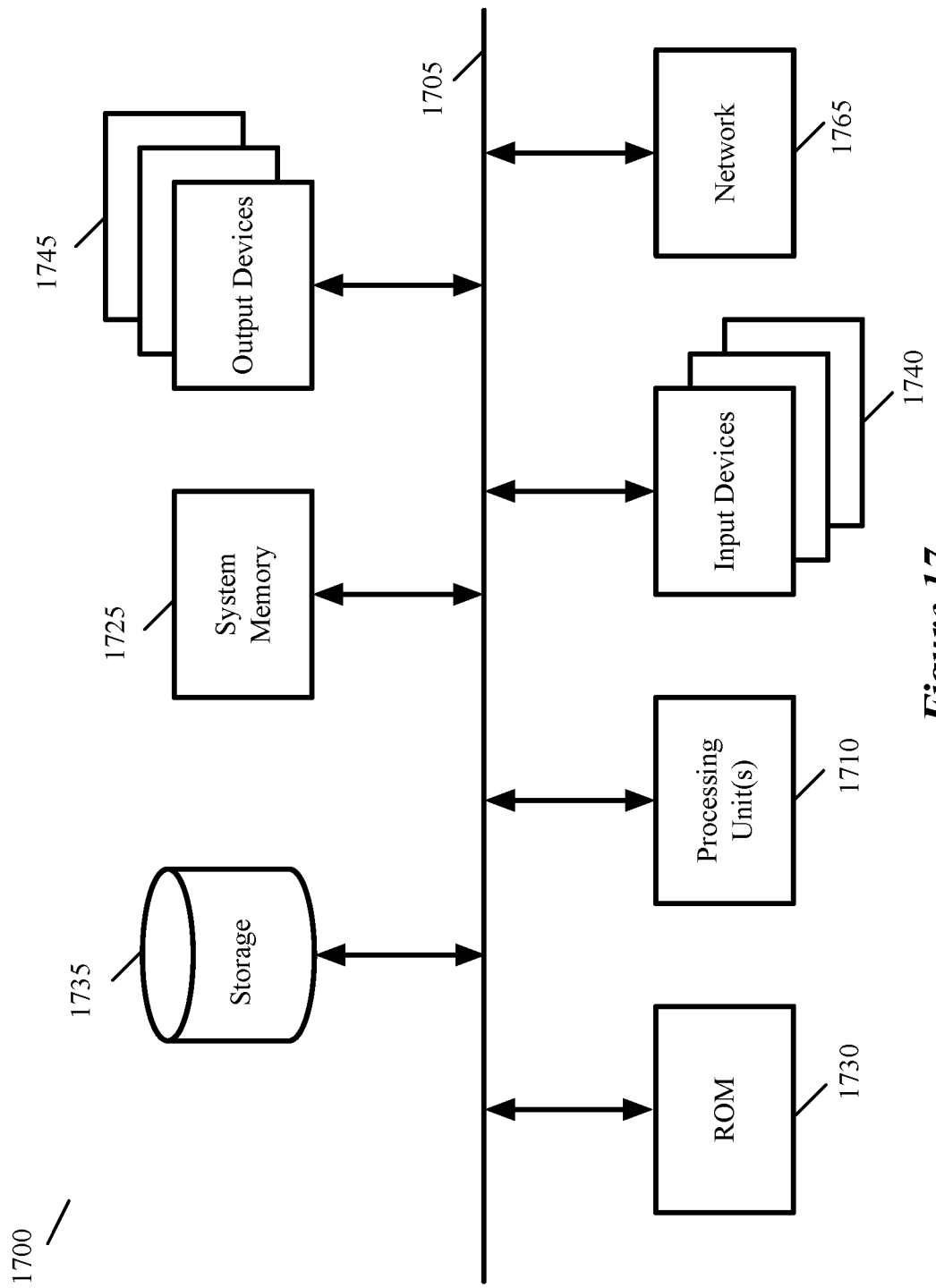
FIG. 17 conceptually illustrates an electronic system with which some embodiments of the invention are implemented.

FIG. 17 conceptually illustrates an electronic system 1700 with which some embodiments of the invention are implemented. The electronic system 1700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1700 includes a bus 1705, processing unit(s) 1710, a system memory 1725, a read-only memory 1730, a permanent storage device 1735, input devices 1740, and output devices 1745.

The bus 1705 collectively represents all system, peripheral, and chipset buses that communicatively connect the numerous internal devices of the electronic system 1700. For instance, the bus 1705 communicatively connects the processing unit(s) 1710 with the read-only memory 1730, the system memory 1725, and the permanent storage device 1735.

From these various memory units, the processing unit(s) 1710 retrieve instructions to execute and data to process in order to execute the processes of the invention. The processing unit(s) may be a single processor or a multi-core processor in different embodiments.

The read-only-memory (ROM) 1730 stores static data and instructions that are needed by the processing unit(s) 1710 and other modules of the electronic system. The permanent storage device 1735, on the other hand, is a read-and-write memory device. This device is a non-volatile memory unit that stores instructions and data even when the electronic system 1700 is off. Some embodiments of the invention use a mass-storage device (such as a magnetic or optical disk and its corresponding disk drive) as the permanent storage device 1735.

Other embodiments use a removable storage device (such as a floppy disk, flash drive, etc.) as the permanent storage device. Like the permanent storage device 1735, the system memory 1725 is a read-and-write memory device. However, unlike storage device 1735, the system memory is a volatile read-and-write memory, such as random-access memory. The system memory stores some of the instructions and data that the processor needs at runtime. In some embodiments, the invention's processes are stored in the system memory 1725, the permanent storage device 1735, and/or the read-only memory 1730. From these various memory units, the processing unit(s) 1710 retrieve instructions to execute and data to process in order to execute the processes of some embodiments.

The bus 1705 also connects to the input and output devices 1740 and 1745. The input devices enable the user to communicate information and select commands to the electronic system. The input devices 1740 include alphanumeric keyboards and pointing devices (also called "cursor control devices"). The output devices 1745 display images generated by the electronic system. The output devices include printers and display devices, such as cathode ray tubes (CRT) or liquid crystal displays (LCD). Some embodiments include devices such as a touchscreen that function as both input and output devices.

Finally, bus 1705 also couples electronic system 1700 to a network 1765 through a network adapter (not shown). In this manner, the computer can be a part of a network of computers (such as a local area network ("LAN"), a wide area network ("WAN"), or an Intranet, or a network of networks, such as the Internet. Any or all components of electronic system 1700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, at least one figure conceptually illustrates a process. The specific operations of this process may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method for evaluating authorization policies that define access to APIs (Application Programming Interfaces) of an application that executes on a machine that is one of a plurality of machines operating on a host computer, the method comprising:
   at a process virtual machine (VM) executing within the application that executes on the machine operating on the host computer:
      receiving a request from a module of the application, within which the process VM executes, to authorize an API call that the application receives and that is to be executed by the application;
      generating an authorization decision for the API call by using a binary process executing within the process VM; and
      sending, to the module of the application from which the request is received, an authorization decision to allow the API call, wherein the application executes the requested API call after receiving the authorization decision to allow the API call.

2. The method of claim 1, wherein the application comprises a native API authorization module executing within the application alongside the process VM the module from which the request is received is a different module than the native API authorization module.

3. The method of claim 1, wherein the binary process comprises a first set of instructions that is not native to the application, wherein the binary process is executed by the process VM by interpreting each instruction in the first set of instructions as an instruction in a second set of instructions in a second language that is native to the application.

4. The method of claim 1, wherein the binary process comprises a first set of instructions that is not native to the application, wherein the binary process is executed by the process VM by translating the first set of instructions into a code and compiling the translated code into a second set of instructions that is native to the application.

5. The method of claim 4, wherein the translated code is optimized for the application before being compiled into the second set of instructions.

6. A method for evaluating authorization policies that define access to APIs (Application Programming Interfaces) of an application that executes on a machine that is one of a plurality of machines operating on a host computer, the method comprising:
   at a process virtual machine (VM) executing within the application:
      receiving a request from the application, within which the process VM executes, to authorize an API call to be executed by the application;
      generating an authorization decision for the API call by (i) generating a set of binary instructions from an API authorization policy code and (ii) authorizing the API call by executing the set of binary instructions; and
      sending, to the application within which the process VM executes, an authorization decision to allow the API call, wherein the application executes the requested API call after receiving the authorization decision to allow the API call.

7. The method of claim 6 further comprising:
   receiving a set of contextual data associated with the API authorization policy code; and
   using at least a subset of the received set of contextual data as an input to the set of binary instructions.

8. The method of claim 7 further comprising identifying at least a portion of the contextual data by using a set of parameters associated with the API call, wherein at least one of the parameters is received by the process VM along with the request from the application.

9. The method of claim 6, wherein authorizing the API call by executing the set of binary instructions comprises, for each binary instruction in the set of binary instructions:
   translating the binary instruction into a binary instruction that is native to the application, and
   executing the translated native instruction.

10. The method of claim 6, wherein the set of binary instructions is a first set of binary instructions, wherein authorizing the API call by executing the set of binary instructions comprises:
    translating the first set of binary instructions into a code;
    optimizing the translated code for at least one of (i) the application within which the process VM executes and (ii) the host, computer;
    compiling the optimized translated code into a second set of binary instructions that are native to the application, and
    executing the native second set of binary instructions.

11. The method of claim 6, wherein generating the set of binary instructions from the API authorization policy code comprises:
    evaluating a portion of the API authorization policy code; and
    compiling the API authorization policy code.

12. The method of claim 6, wherein:
generating the set of binary instructions from the API authorization code comprises using one or more policy extension codes in addition to the API authorization policy code to generate the set of binary instructions;
the policy extension codes define extensions to the API authorization policy; and
at least one of the policy extension codes is in a different language than the API authorization policy code.

13. The method of claim 1, wherein the application comprises a native API authorization module executing within the application alongside the process VM and the request is received from the native API authorization module.

14. A method for evaluating authorization policies that define access to APIs (Application Programming Interfaces) of an application executing on a host system, the method comprising:
at a process virtual machine (VM) executing as a runtime interpreter for an instruction set inside the application:
receiving a request from the application to authorize an API call to be executed by the application;
generating an authorization decision for the API call; and
sending, to the application, an authorization decision to allow the API call, wherein the application executes the requested API call after receiving the authorization decision to allow the API call.

15. The method of claim 14, wherein the instruction set is one of WebAssembly (WASM), Lua, or extended Berkeley Packet Filter (eBPF).

16. A non-transitory machine readable medium storing a process virtual machine (VM) executing within an application that is one of a plurality of machines executing on a host computer, the process VM for evaluating authorization policies that define access to APIs (Application Programming Interfaces) of the application within which the process VM executes, the process VM comprising sets of instructions for:
receiving a request from a module of the application, within which the process VM executes, to authorize an API call that the application receives and that is to be executed by the application;
generating an authorization decision for the API call by using a binary process executing within the process VM; and
sending, to the module of the application from which the request is received, an authorization decision to allow the API call, wherein the application executes the requested API call after receiving the authorization decision to allow the API call.

17. The non-transitory machine-readable medium of claim 16, wherein the application comprises a native API authorization module executing within the application alongside the process VM and the module from which the request is received is a different module than the native API authorization module.

18. A non-transitory machine readable medium storing a process virtual machine (VM) executing inside an application that executes on a host computer, the process VM for evaluating authorization policies that define access to APIs (Application Programming Interfaces) of the application executing on the host computer, the process VM comprising sets of instructions for:
receiving a request from the application to authorize an API call to be executed by the application;
generating an authorization decision for the API call by (i) generating a set of binary instructions from an API authorization policy code and (ii) authorizing the API call by executing the set of binary instructions; and
sending, to the application, an authorization decision to allow the API call, wherein the application executes the requested API call after receiving the authorization decision to allow the API call.

19. The non-transitory machine readable medium of claim 18, wherein the process VM further comprises sets of instructions for:
receiving a set of contextual data associated with the API authorization policy code; and
using at least a subset of the received set of contextual data as an input to the set of binary instructions.

20. The non-transitory machine-readable medium of claim 16, wherein the application comprises a native API authorization module executing within the application alongside the process VM and the request is received from the native API authorization module.

* * * * *